US007467712B2

(12) United States Patent
Carroscia

(10) Patent No.: US 7,467,712 B2
(45) Date of Patent: Dec. 23, 2008

(54) WELDING WIRE CONTAINER AND METHOD OF MAKING THE SAME

(75) Inventor: Michael A. Carroscia, Newbury, OH (US)

(73) Assignee: Lincoln Global, Inc., City of Industry, CA (US)

( * ) Notice: Subject to any disclaimer, the term of this patent is extended or adjusted under 35 U.S.C. 154(b) by 483 days.

(21) Appl. No.: 11/222,336

(22) Filed: Sep. 8, 2005

(65) Prior Publication Data

US 2007/0051649 A1    Mar. 8, 2007

(51) Int. Cl.
*B65D 85/66*    (2006.01)
(52) U.S. Cl. .................. 206/408; 206/409; 206/523; 206/593
(58) Field of Classification Search ............. 206/389, 206/397, 408, 409, 412, 523, 591, 593, 594; 242/129, 171, 172, 361.4
See application file for complete search history.

(56) References Cited

U.S. PATENT DOCUMENTS

| | | | | |
|---|---|---|---|---|
| 2,062,948 A | * | 12/1936 | Swank et al. | 206/585 |
| 3,732,974 A | * | 5/1973 | Ram et al. | 206/412 |
| 3,900,116 A | * | 8/1975 | Gehri | 206/443 |
| 4,957,344 A | * | 9/1990 | Chesler et al. | 242/171 |
| 5,409,114 A | * | 4/1995 | Myers et al. | 206/394 |
| 5,746,380 A | | 5/1998 | Chung | |
| 5,819,934 A | | 10/1998 | Cooper | |
| 6,019,303 A | | 2/2000 | Cooper | |

* cited by examiner

*Primary Examiner*—Luan K Bui
(74) *Attorney, Agent, or Firm*—Fay Sharpe LLP

(57) ABSTRACT

A container for packaging and unwinding a coil of welding wire. The wire coil being formed by a plurality of convolutions of welding wire. The container including an outer container having at least one vertically extending side wall, a wire receiving cavity within the outer container for receiving the wire coil, a closed bottom and a top opening for removing the welding wire. The container further including a foam intermixed in the wire coil.

19 Claims, 17 Drawing Sheets

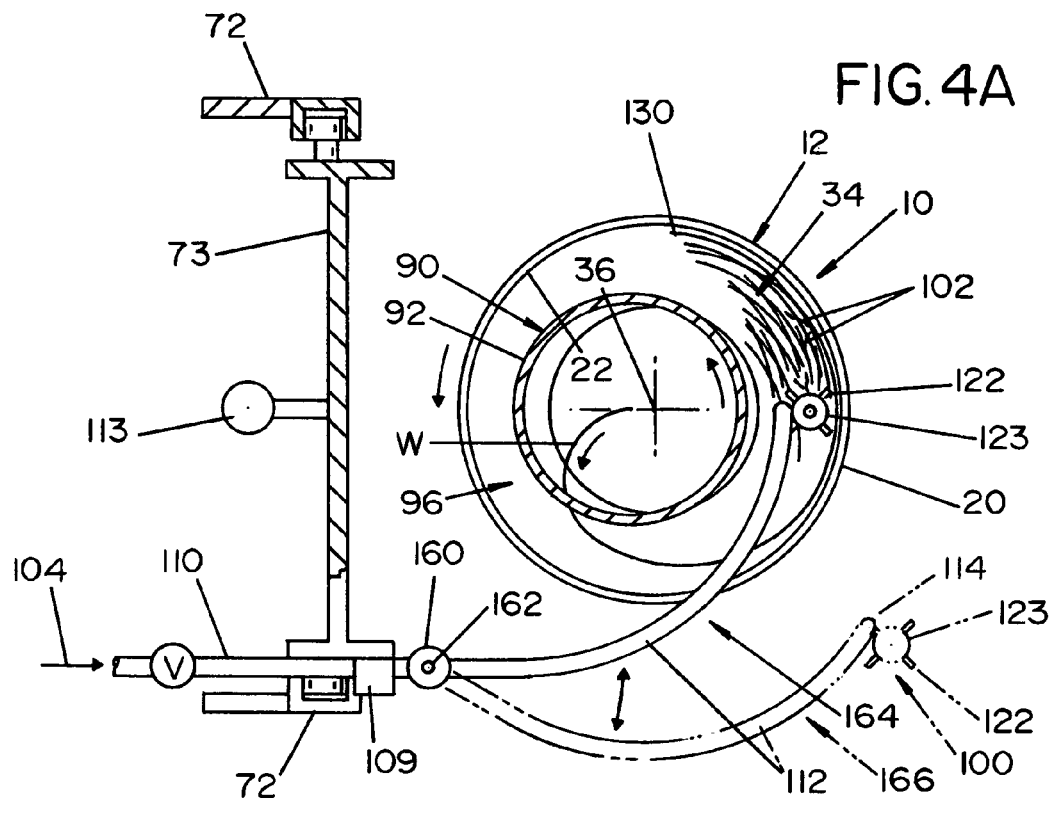
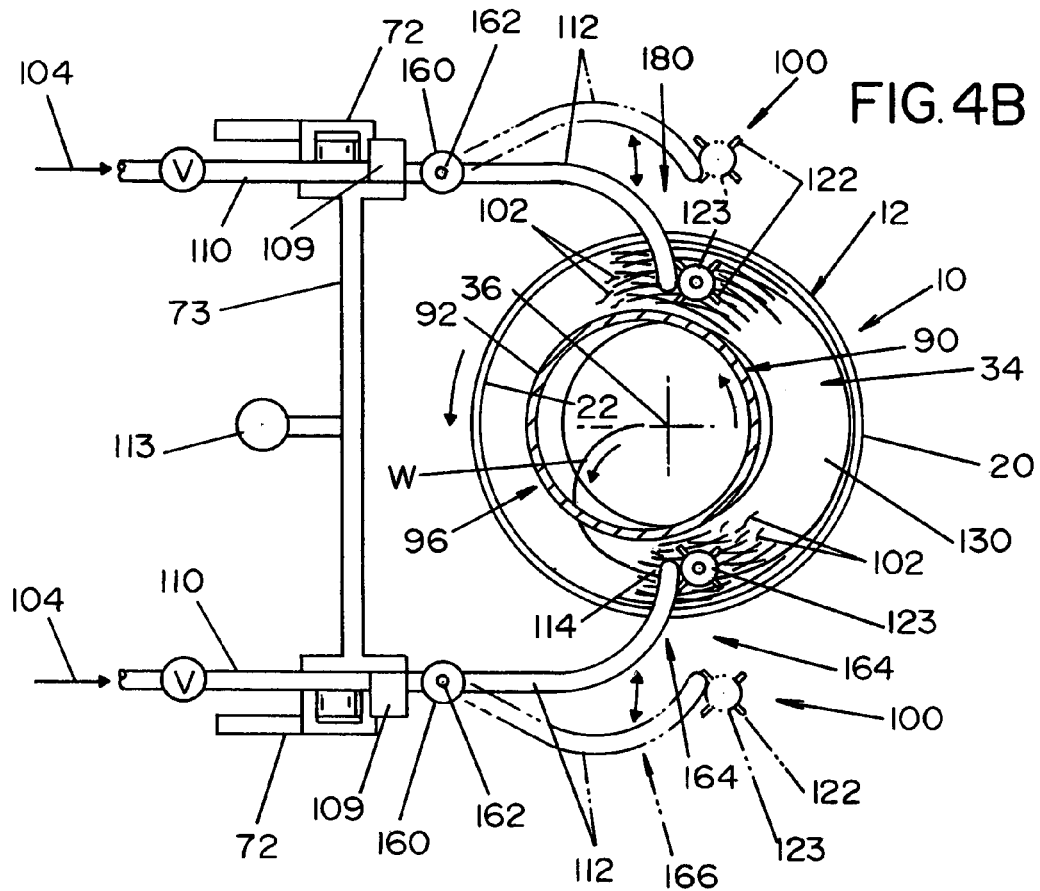

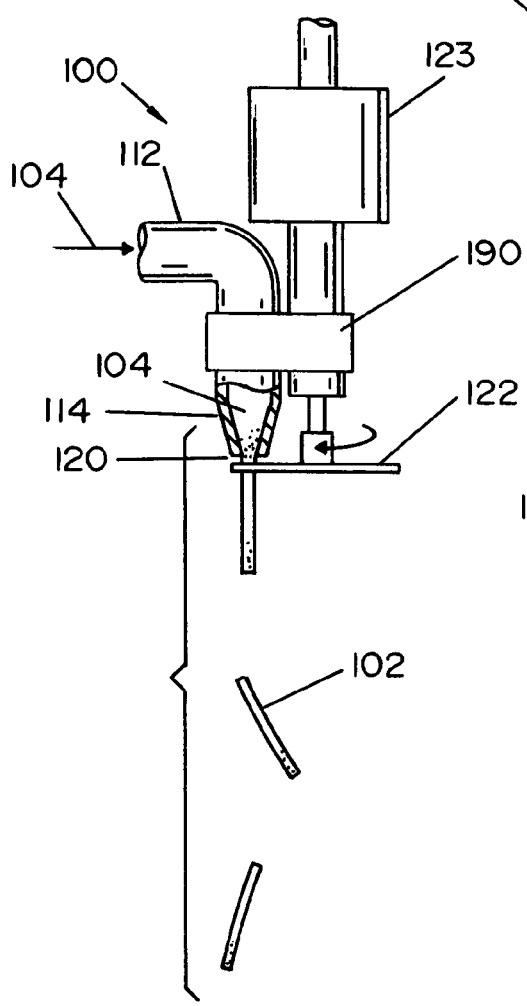
FIG. 5
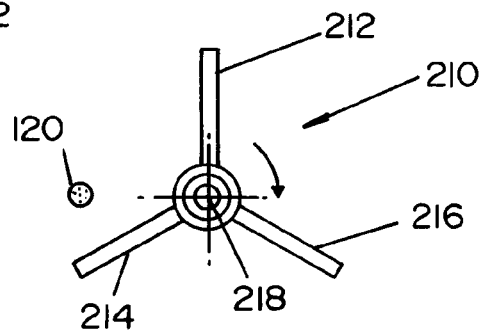
FIG. 6A
FIG. 6B
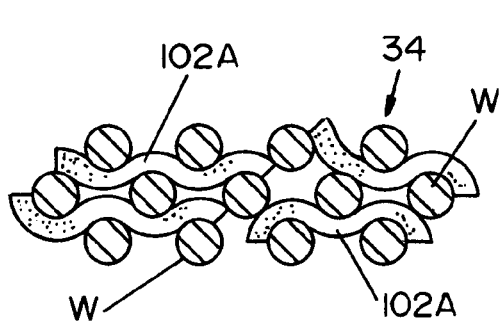
FIG. 7A
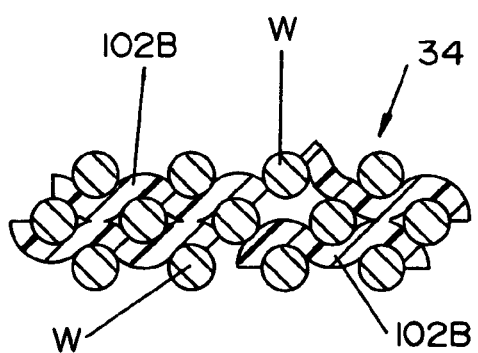
FIG. 7B

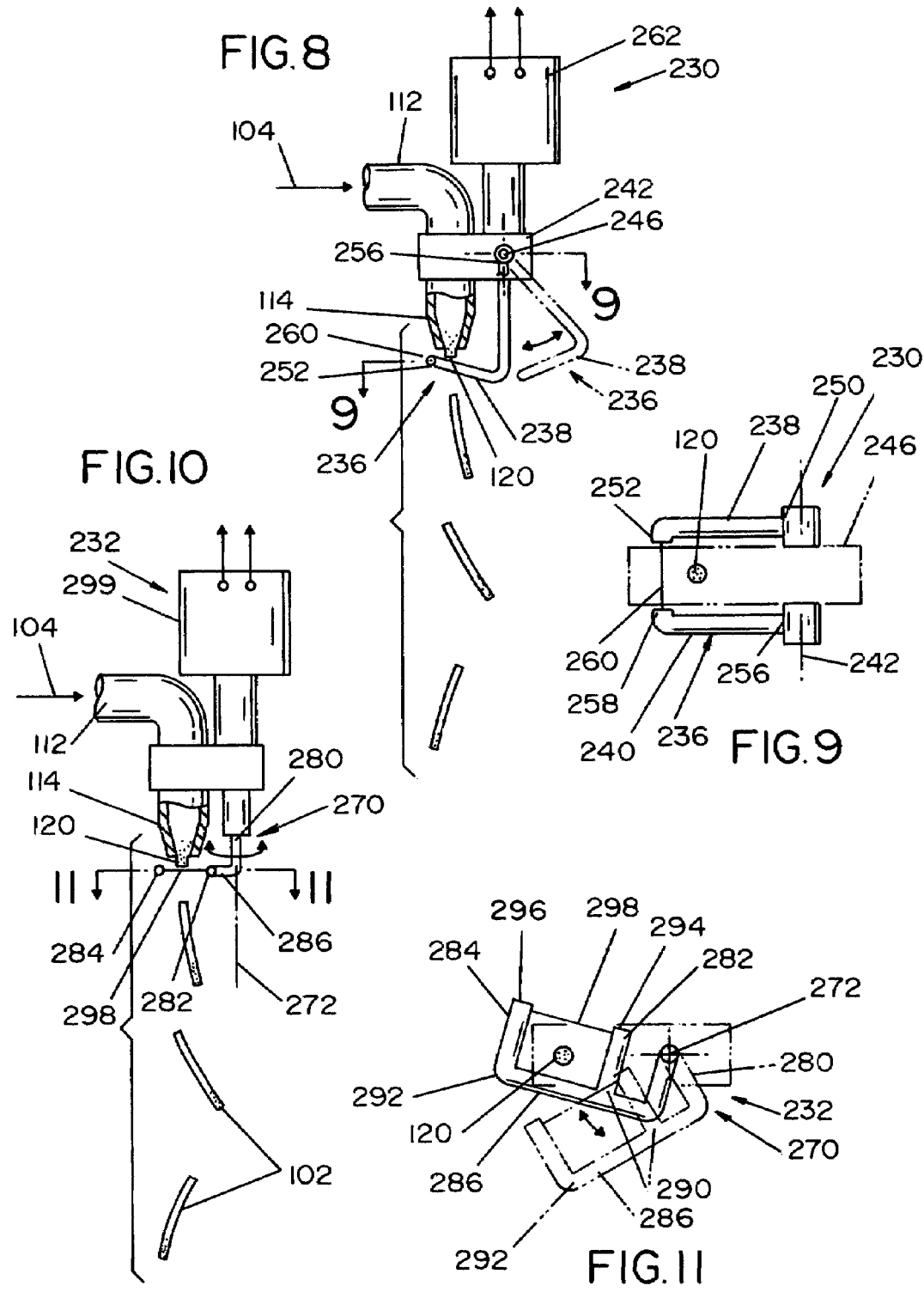

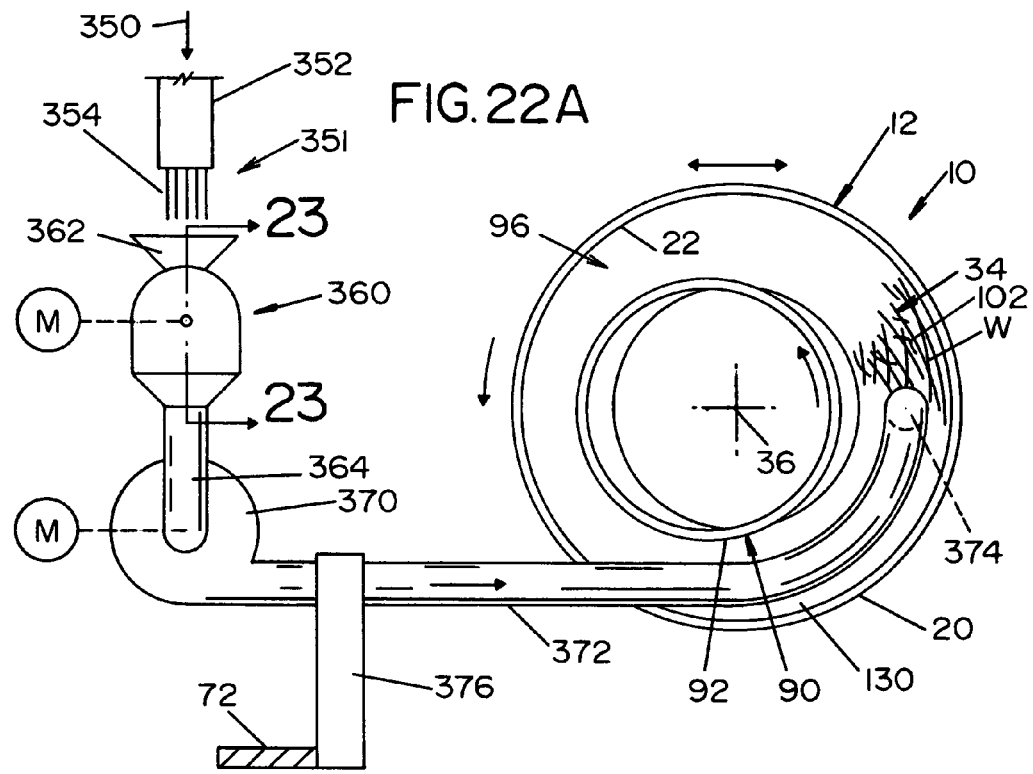
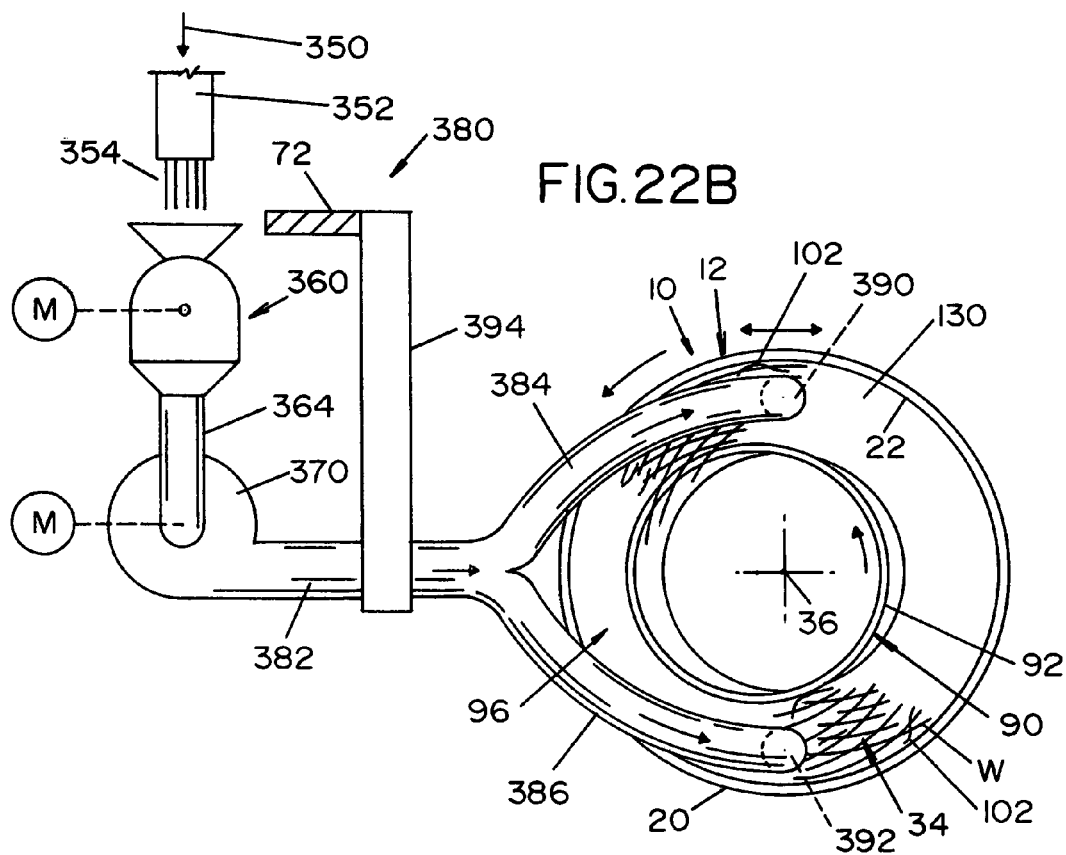

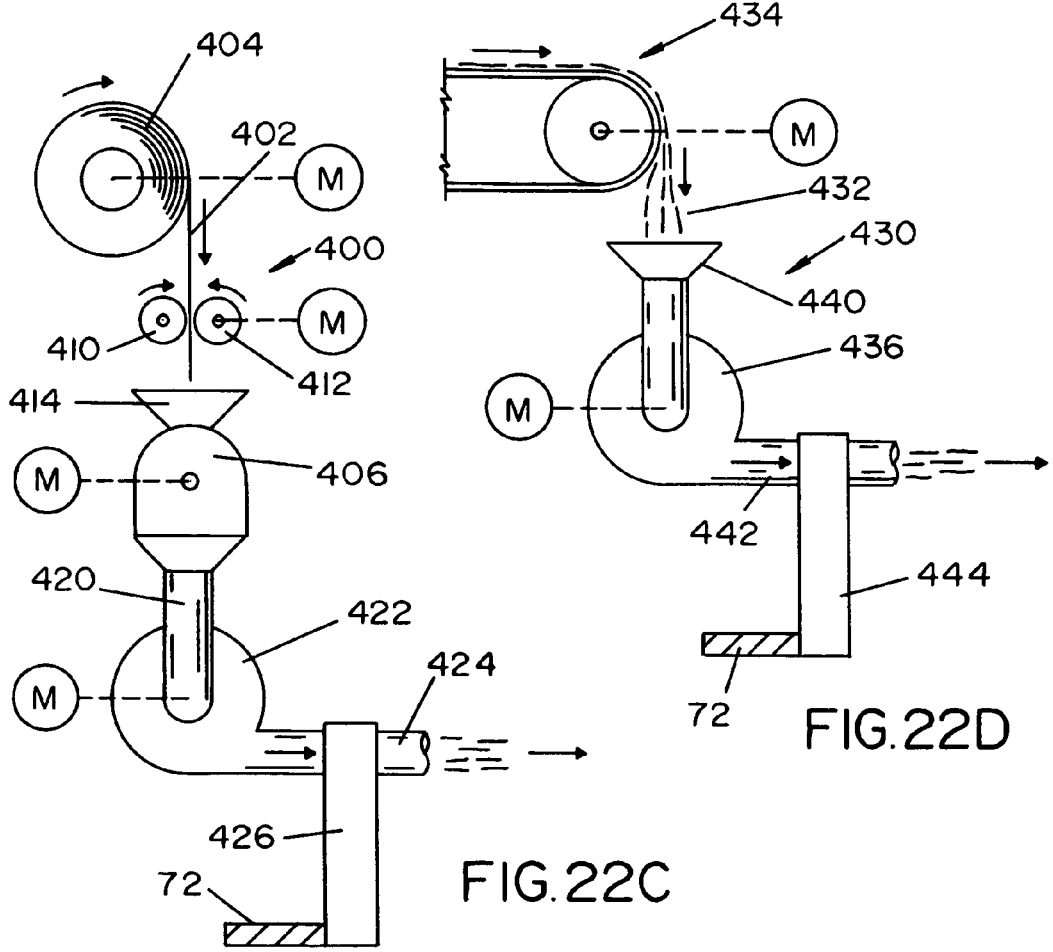
FIG.22C
FIG.22D
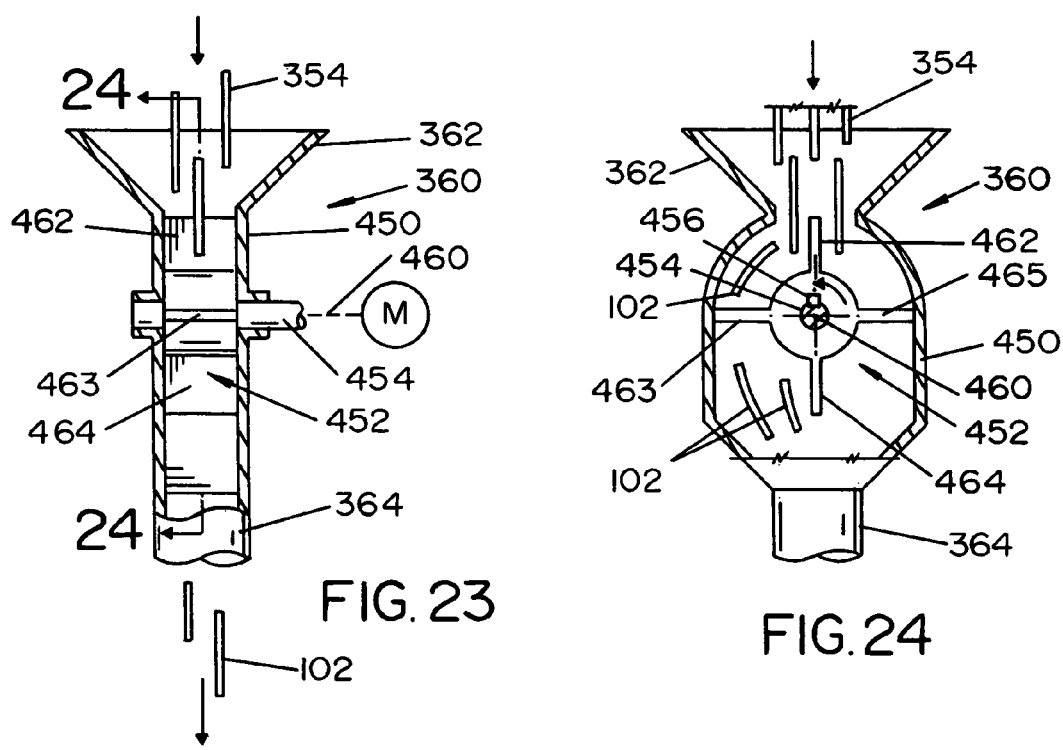
FIG.23
FIG.24

WELDING WIRE CONTAINER AND METHOD OF MAKING THE SAME

The present invention relates to welding wire packaging and more particularly to welding wire package that utilizes a compressible material intermixed within the wire coil to stabilize the wire coil and/or aid in the unwinding of the welding wire from the wire coil.

INCORPORATION BY REFERENCE

Welding wire used in high production operations, such as robotic welding stations, is provided in a large package having over 200 pounds of wire. The welding wire in these packages is looped into convolutions of wire loops forming a wire coil extending around a central core or a central clearance bore. One such winding technique is shown in Cooper U.S. Pat. No. 6,019,303 which discloses a method and apparatus for packing wire in a storage drum and which is incorporated by reference herein as background material showing the same.

During transportation, a hold-down mechanism can be used to prevent the wire coil from shifting and to prevent the central core from shifting. To control the transportation and payout of the wire, an upper retainer or braking device, such as a braking ring, can be used to help control the unwinding of the wire from the wire coil. One such package is shown in Cooper U.S. Pat. No. 5,819,934, which discloses a welding wire drum that utilizes a braking ring to control the unwinding of the welding wire from the wire coil. Cooper U.S. Pat. No. 5,819,934 is incorporated by reference herein as background material showing the same. Another such packaging is shown in Chung U.S. Pat. No. 5,746,380, which also discloses a welding wire drum, however, Chung discloses a different wire flow controlling apparatus for controlling the payout of the welding wire from the drum. Chung is also incorporated by reference herein for showing the same.

BACKGROUND OF INVENTION

In the welding industry, a tremendous number of robotic welding stations are operable to draw welding wire from a package as a continuous supply of wire to perform successive welding operations. The advent of this mass use of electric welding wire has created a need for large packages for containing and dispensing large quantities of welding wire. A common package is a drum where looped welding wire is deposited in the drum as a wire stack or coil of wire having a top surface with an outer cylindrical surface against the drum and an inner cylindrical surface defining a central bore that is coaxial to a central package axis. The central bore is often occupied by a cardboard cylindrical core, as shown in Cooper U.S. Pat. No. 5,819,934, extending about a core axis that is coaxial to the package axis. It is common practice for the drum to have an upper retainer ring that is used in transportation to stabilize the body of welding wire as it settles. This ring, as is shown in Cooper U.S. Pat. No. 5,819,934, remains on the top of the welding wire to push downward by its weight so the wire can be pulled from the body of wire between the core and the ring. In addition, a hold-down mechanism can be utilized to increase the downward force.

The welding wire in the package is in loops or convolutions wrapped about the package axis and forms the wire coil having a top and a bottom. The coil further includes radial inner and outer surfaces extending between the top and the bottom of the coil. As the welding wire is removed from the package, the wire is removed from the top coils or convolutions of wire wherein the top of the wire coil moves downwardly into the package. As a result, the top of the wire coil descends within the package and the outer and inner surfaces of the coil become shorter and shorter. Any braking device used in the packaging, which will be discussed in greater detail below, must then also be capable of descending within the package during the unwinding of the welding wire.

In order to work in connection with the wire feeder of the welder, the welding wire must be dispensed in a non-twisted, non-distorted and non-canted condition, which produces a more uniform weld without human attention. It is well known that wire has a tendency to seek a predetermined natural condition which, can adversely affect the welding process. Accordingly, the wire must be sufficiently controlled by the interaction between the welding wire package and the wire feeder. To help in this respect, the manufacturers of welding wire produce a wire having natural cast wherein, if a segment of the wire was laid on the floor, the natural shape of the wire would be essentially a straight line; however, in order to package large quantities of the wire, the wire is coiled into the package which can produce a significant amount of wire distortion and tangling as the wire is dispensed from the package. As a result, it is important to control the payout of the wire from the package in order to reduce twisting, tangling or canting of the welding wire. This condition is worsened with larger welding wire packages, which are favored in automated or semi-automated welding.

The payout portion of the welding wire package helps control the outflow of the welding wire from the package without introducing additional distortions in the welding wire to ensure the desired continuous smooth flow of welding wire. Both tangling or breaking of the welding wire can cause significant downtime while the damaged wire is removed and the wire is re-fed into the wire feeder. In this respect, when the welding wire is payed out of the welding wire package, it is important that the memory or natural cast of the wire be controlled, so that the wire does not tangle. The welding wire package comprises a coil of wire having many layers of wire convolutions laid from the bottom to the top of the package. These convolutions together form an inner diameter and an outer diameter wherein the inner diameter is substantially smaller than the width or outer diameter of the welding wire package. In this respect, the convolutions together form the radial inner and outer surfaces discussed above. The memory or natural cast of the wire causes a constant force in the convolutions of wire which is directed outwardly, such that the diameter of the convolutions is under the influence of force to widen. The walls of the wire welding package prevent such widening. However, when the welding wire is payed of the package, the walls of the package lose their influence on the wire, and the wire is forced toward its natural cast. This causes the portion of the wire which is being withdrawn from the package to loosen and tend to spring back into the package, thereby interfering with and possibly becoming tangled with other convolutions of wire. In addition to the natural cast, the wire can have a certain amount of twist, which causes the convolutions of welding wire in the coil to spring upwardly.

Payout devices, braking devices or retainer rings have been utilized to control the spring back and upward springing of the wire, along with controlling the payout of the wire. This is accomplished by positioning the payout or retainer ring on the top of the coil and forcing it downwardly against the natural springing effect of the welding wire. The downward force is either the result of the weight of the retainer ring or a separate force-producing member such as an elastic band connected between the retainer ring and the bottom of the package. Further, the optimal downward force during the shipment of the package is different than the optimal downward force for the payout of the welding wire. Accordingly, while elastic bands or other straps are utilized to maintain the position of the payout or retainer ring during shipping, the weight of the retainer ring can be used to maintain the position of the payout relative to the wire coils during the payout of the wire. However, the braking device must descend within the package as the wire in unwound from the wire coil. Further, the braking device must prevent the welding wire from springing up from the perimeter of the device which necessitates a close fit between the container and at least a portion of the braking device. As can be appreciated, imperfections in the container, coupled with a close fit between the container and the braking device, can cause the braking device to become lodged in the wire cavity, based on improper engagement with a container wall. This can be overcome by utilizing projecting lobes, as is shown in Cooper U.S. Pat. No. 5,819, 934, or other container engaging projection, however, these can increase the cost of the packaging.

The welding wire can also be controlled by other mechanisms such as the packaged beads, as is shown in Chung. The packaged beads, along with pressing pipes, help control the out flowing welding wire as it exits the wire drum.

As can also be appreciated, the braking device can increase the overall cost and the shipping weight of the packaging. In order to provide a sufficient downward force, the braking devices used are made from dense materials such as different metals and plastics. Depending on the weight of the ring produced in a desired configuration, the braking device may need to have an increased thickness or a secondary weight source to produce a desired downward force to overcome the upward springing effect of the wire in the wire coil.

In order to prevent coil shifting during transportation of the container, the wire container often needs a separate hold down mechanism that can work in connection with the braking device to maintain the wire coil. The hold-down mechanism is typically an elastic member connected between the bottom of the container and a hold-down bar or member positioned above the braking device. The hold-down mechanism needs to be at least partially removed before the wire can be unwound from the coil for a welding operation.

STATEMENT OF INVENTION

In accordance with the present invention, a welding wire package or container for containing and dispensing wire from a wire coil is provided which utilizes a compressible material interspersed within the wire coil.

In this respect, provided is a container for packaging and unwinding a coil of welding wire. The wire coil is formed by a plurality of convolutions of welding wire wrapped about an axis. The wire coil can be any known configuration including a coil having a first end near the bottom of the package with a second end near the top of the package with convolutions of wire between the first and second ends. Further, these ends, one and/or both ends, can include extensions to allow, for example, the end to be easily found by the end user and/or to allow the package wire coil to be used in connection with an "endless wire" packaging design. In this respect, the wire coil can include a first end with an extension that extends from near the bottom of the coil to the top of the packaging. The container can further include an outer container having a vertically extending side wall and a wire receiving cavity within the outer container for receiving the wire coil, the container further including a closed bottom and a top opening for removing the welding wire. A compressible material is intermixed in the wire coil to help stabilize the wire coil during shipping and/or to help control the wire during the unwinding of the wire from the wire coil.

According to another aspect of the present invention, the compressible material can extend and/or be positioned from the top of the wire coil to the bottom of the wire coil.

According to yet another aspect of the present invention, the container can include a plurality of compressible particles intersperse in the wire coil.

According to yet a further aspect of the present invention, a method of winding a welding wire into a welding wire container is provided. The method including the steps of providing a container for packaging and unwinding a coil of welding wire wherein the container includes an outer container body with at least one vertically extending side wall and a wire receiving cavity. Then, winding a plurality of convolutions of welding wire into the wire receiving cavity and dispensing the compressible material into the wire receiving cavity during the winding of the wire coil.

BRIEF DESCRIPTION OF DRAWINGS

The foregoing, and more, will in part be obvious and in part be pointed out more fully hereinafter in conjunction with a written description of preferred embodiments of the present invention illustrated in the accompanying drawings in which:

FIG. 4A is a sectional view taken generally along line 4A-4A of FIG. 3A;

FIG. 4B is a sectional view taken generally along line 4B-4B of FIG. 3A;

FIG. 5 is an enlarged elevational view of yet another nozzle configuration according to another aspect of the present invention;

FIG. 6A is an enlarged top plan view of the blade shown in FIG. 5;

FIG. 6B is an enlarged elevational view of another blade for the nozzle configuration shown in FIG. 5;

FIG. 7A is an enlarged view of a portion of the welding wire and compressible material taken from section 7A in FIG. 2 near the top of the container;

FIG. 7B is an enlarged view of a portion of the welding wire and compressible material taken from section 7B in FIG. 2 below section 7A;

FIG. 8 is an enlarged elevational view of yet a further nozzle configuration according to another aspect of the present invention wherein the nozzle assembly includes a heated wire;

FIG. 9 is a sectional view taken generally along line 9-9 of FIG. 8;

FIG. 10 is an enlarged elevational view of another nozzle configuration according to a further aspect of the present invention wherein the nozzle assembly includes a heated wire;

FIG. 11 is a sectional view taken generally along line 11-11 of FIG. 10;

FIG. 22A is a schematic view of yet another nozzle configuration including a shredder for the compressible material;

FIG. 22B is a schematic view of even yet another nozzle configuration including another material dispensing arrangement for the shredded compressible material;

FIG. 22C is an elevational view of a nozzle configuration including a foam shredder and sheet foam material;

FIG. 22D is an elevational view of a nozzle configuration including a material handling system for particle foam;

FIG. 23 is a sectional view taken generally along line 23-23 of FIG. 22A;

FIG. 24 is a sectional view taken generally along line 24-24 of FIG. 23;

DESCRIPTION OF PREFERRED EMBODIMENTS

Figure 1:
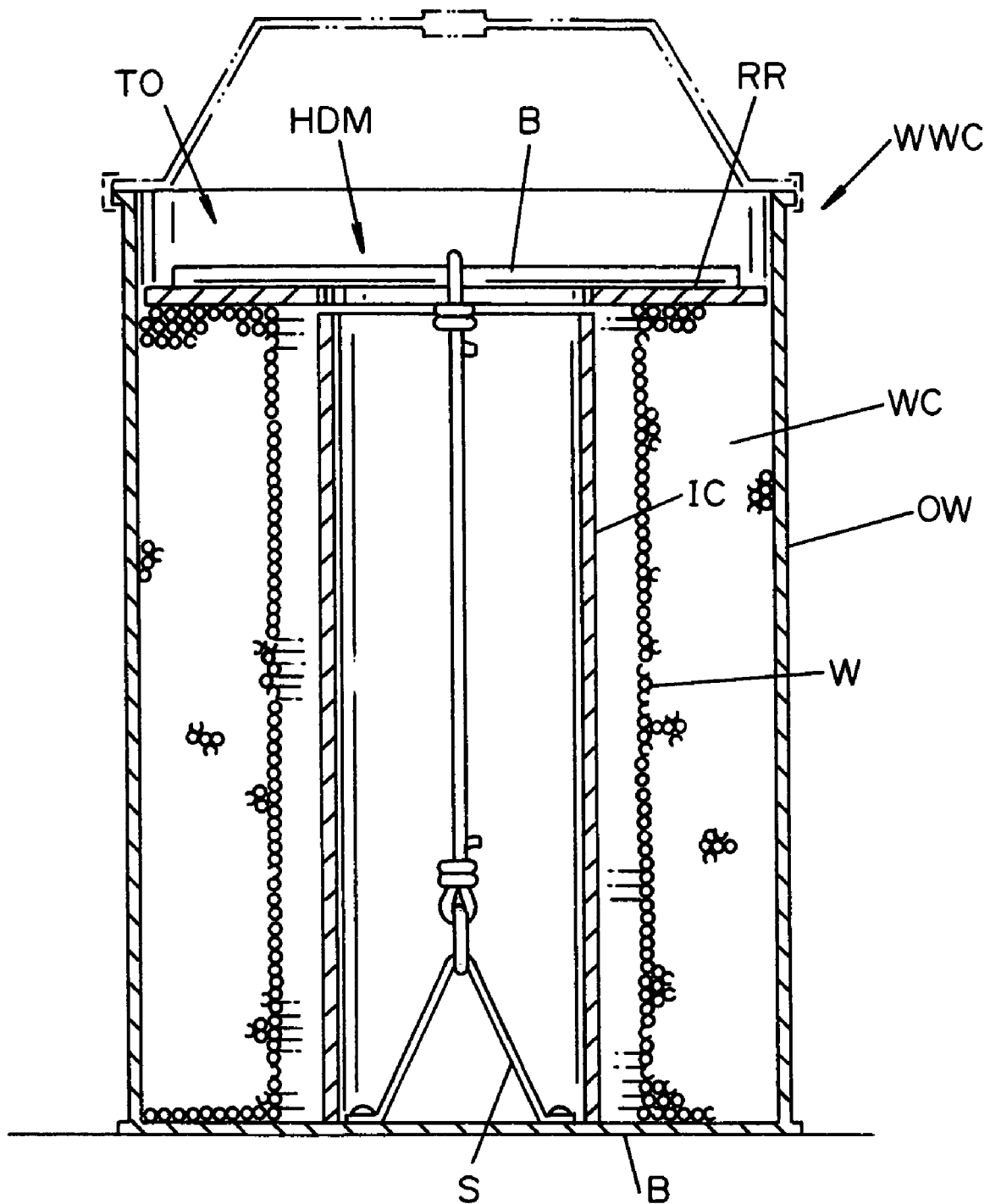
FIG. 1 is a vertical sectioned view of a prior art welding wire container.

Referring now in greater detail to the drawing wherein the showings are for the purpose of illustrating preferred embodiments of the invention only and not for the purpose of limiting the invention, FIG. 1 shows a prior art welding wire container WWC having a wire coil WC. The container includes an outer wall OW that can be cylindrical, square or other configurations known in the art. The container further includes a bottom B and a top opening TO wherein a wire W can be loaded and dispensed from the top opening. Container WWC can further include an inner core IC which is positioned within the central-cylindrical opening of the wire coil. The container can further include a hold-down mechanism HDM for controlling the wire coil during shipment and/or unwinding. In this respect, the hold-down mechanism shown includes a payout or retainer ring RR that can be used to control the unwinding of the wire from the wire coil and a tensioning device to put an increased downward force on the wire coil to prevent shifting of the coil during shipment. The tensioning device includes a hold-down bar B and an elastic band E, which are joined to container bottom B by a strap S.

As can be appreciated, while hold-down mechanisms known in the art can be effective, they can be heavy and can add significant cost for components that are traditionally discarded after the welding wire is consumed. Also, prior art hold-down mechanisms rely on the structural aspects of the outer container to function properly as is discussed above. In this respect, RR ring must prevent wire from springing up between the ring and the outer wall such that a small gap therebetween is optimal. The size of the gap between these components is largely dependent on the consistency of the outer wall and the condition of the outer wall. If, for example, the drum-style container has an outer wall that is out of round, the retainer ring may not be able to freely descend within the container. As a result, manufacturing tolerances become more important if not critical. Further, if the outer wall is damaged during shipment or use, the ring may not function properly. In addition, the bottom of the container must be rigid to support the hold-down mechanism. Often, this includes use of rigid materials, such as wooden components, to reinforce the bottom to prevent damage from the upward forces produced by the hold-down mechanism.

Figure 2:
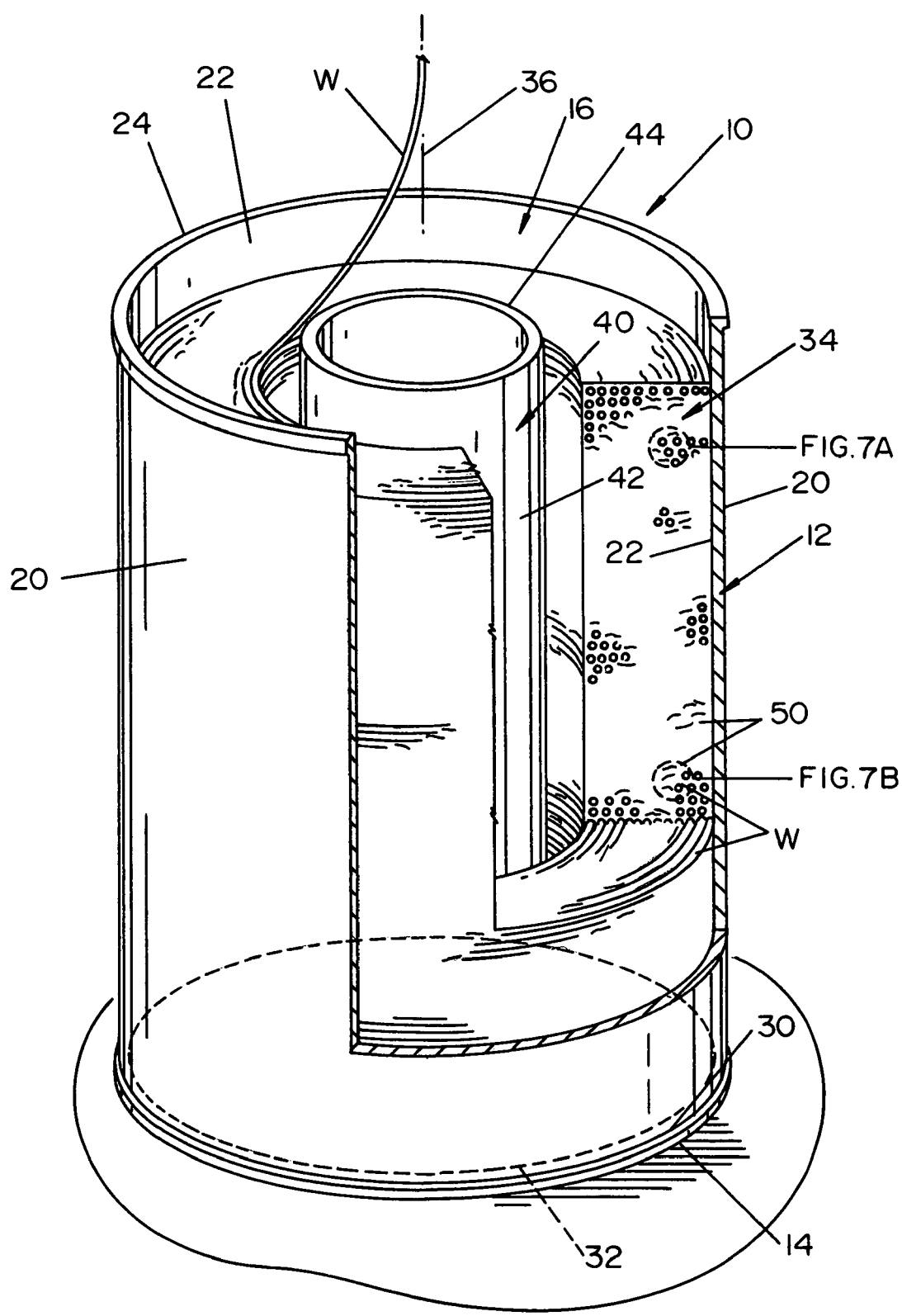
FIG. 2 is a perspective view of a welding wire container according to an aspect of the present invention with parts broken away.

With reference to FIG. 2, shown is a container according to an aspect of the present invention. In this respect, shown is container 10, which is a drum-style container. However, the invention of this application is not to be limited to drum containers, in that it can be used in connection with a wide range of containers used to hold welding wire. Container 10 includes a side wall 12, a bottom 14 and a top opening 16. Side wall 12 includes an outer surface 20 and an inner surface 22 with a top edge 24 that defines top opening 16. Bottom 14 can be secured to a bottom edge 30 of wall 12 and includes an upward facing surface 32 for supporting a wire coil 34 that extends about a coil axis 36 and which will be discussed in greater detail below. The container can further include a central core 40 that can be cylindrical, or generally cylindrical, with an outer surface 42. Central core 40 has a top edge 44 that is at or near top edge 24 to further define top opening 16 as an annular top opening.

As will be discussed in greater detail below, welding wire W is wound into the container using any one of many winding techniques know in the art with the inclusion of a dispensing system used to dispense a compressible material 50, such that welding wire coil 32 includes welding wire W along with material 30. As is stated above, the coil can be wound into any coil configuration including coil configurations for use as an "endless wire" packaging wherein an end a first wire coil can be joined to an end of a second wire coil.

The compressible material can be any one of a large variety of compressible materials including, but not limited to, a cellulose foam material. The foam acts to stabilize the wire coil during shipment and/or other movements of the packaging and/or acts to control the unwinding of the wire during the use of the welding wire at the welding operation. Further, the material can be an air drying material, such that it cures once in position in the coil or during the application in the coil. In addition, the material can also be in solid form before its application in the welding wire coil. Yet even further, the material can be a non-adhesive style material wherein the material does not adhere to the welding wire and will easily fall from the welding wire during the unwinding of the wire. As can be appreciated, the material can also be a non-magnetic material and/or a material that does not produce static electricity or at least only produces low levels of static electricity to minimize the effect of the material on the welding operation. The configuration of the material and the method of depositing the material will be discussed in greater detail below.

As is stated above, the material can be injected or deposited into the wire stack or coil as the drum or box is being filled. Further, the material can be used to stabilize the wire for shipping as well as control the wire during payoff. But, yet even further, the material in the wire coil also improves the durability of the package, offers moisture protection, improves package performance and eliminates the need for the payoff ring and/or hold-down mechanisms, as are discussed above. As can be appreciated, based on the physical requirements of the payout ring and the hold-down mechanism, these components are not easily recycled or at least need to be separated from the outer container before recycling.

In the following discussions concerning the winding of the welding wire into a wire coil, particular reference is made to one type of welding apparatus. However, as is stated above, the invention of this application can be practiced in connection with a wide variety of welding methods and is not to be limited to the below described winding set-up. The particular set-up described below is only for illustrative purposes to show several application techniques. Further, in that the winding technique is known in the art, the winding mechanism will not be described in detail. Again, Cooper U.S. Pat. No. 6,019,303 discloses the winding aspect of the winding techniques described below and is incorporated by reference herein for showing the same.

Figure 3A:
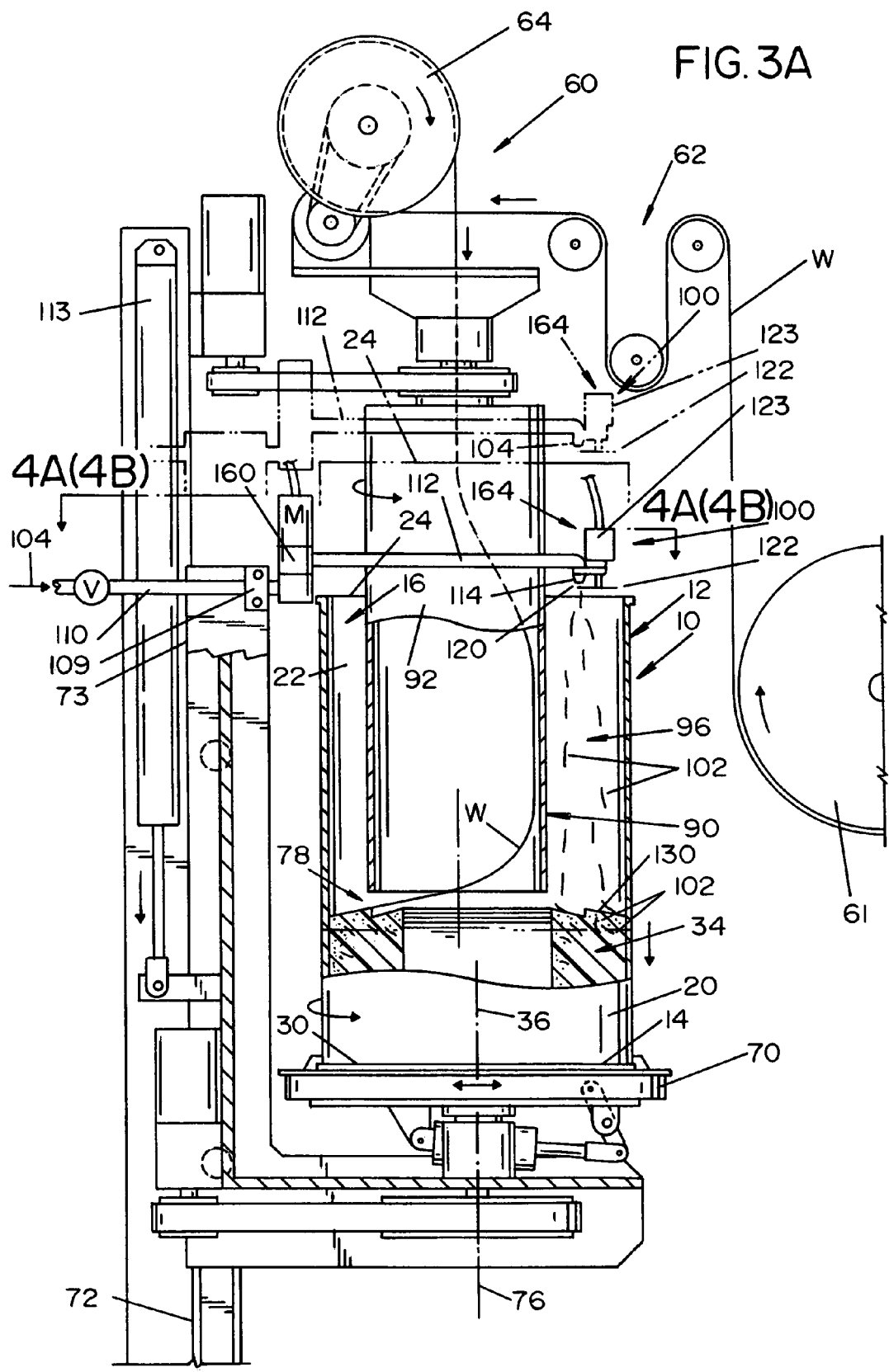
FIG. 3A is an elevational view of a winding machine for winding a welding wire container, such as the container shown in FIG. 1, wherein the compressible material nozzle(s) remain(s) above the welding wire container during the winding of the welding wire coil and parts are broken away.

With reference to FIG. 3A, shown is container 10 positioned in a winding apparatus 60. Winding apparatus 60 directs welding wire W from a wire source 61 through a series of tensioning rollers 62 and around a roller 64 that can be used to create a desired shape in the welding wire and then down into container 10. Container 10 is supported by a frame member 70 that can move relative to a machine frame 72. Further, member 70 can also rotate above an axis 76. As a result, as wire W is delivered to container 10, the container is rotated about axis 76 to allow the welding wire to be formed into a wire coil. As can be appreciated, as the wire is wound into the container, the top edge of the wire coil moves upwardly within the container. As a result, point of application 78 of the wire-to-wire coil 80 moves relative to container bottom 14 as wire W is deposited into coil 80. Accordingly, machine 60 can include a member 70 capable of axial movement along axis 76. This allows application point 78 to be maintained generally at the same point relative to frame 72 and the wire handling mechanisms of the machine. As can be appreciated, the exact point of contact between wire W and coil 80 will be in constant movement as the wire is wrapped around axis 36.

Machine 60 can further include a wire guiding sleeve 90 having an outer surface 92 wherein sleeve 90 defines an inner extent of a winding region 96 between surface 92 and inner container surface 22. In this particular machine, sleeve 90 has a diameter larger than the inner diameter of coil W and frame member 70 can further move transverse to axis 76 during the winding of the wire coil. This can be utilized to produce and maintain desired spacings between surfaces 92 and 22 about axis 76. As can be appreciated, member 70 can also move in other ways relative to frame 72 to produce different coil properties without detracting from the invention of this application.

Machine 60 further includes a dispensing system 100 that is a particle dispensing system that dispenses particles 102 into container 10. In greater detail, dispensing system 100 is joined to a supply of a compressible material 104 (supply reserve not shown) that flows through deliver tubes 110 and 112 toward a dispensing nozzle 114. Dispensing system 100 is joined to frame 72 and/or maintained relative to frame 72 wherein nozzle 114 is retained at or near top opening 16 of container 10. Material 104 can exit from nozzle 114 as a stream of material 120 that is directed downwardly toward container 10. System 100 can further include a chopping blade 122 positioned below nozzle 114 to cut compressible material 104 into particles 102 that fall into container 10 at a desired point relative to application point 78. As will be discussed in greater detail below, material 104 can be a solid or a liquid as it is dispensed into the container. In this particular embodiment, the material is dispensed as a liquid wherein the liquid is cured after it exits nozzle 114. As stream 120 exits nozzle 144, material is cut into particles 102 by chopping blade 122 wherein particles 102 fall onto coil top 130. Chopper blade 122 can be driven by a motor 123 that can be any motor known in the art. Particles are continuously produced by system 100 such that the particles are interspersed within the wire coil as it is produced. By utilizing a material that is compressible, the particles form around wire W and lock the wire into position. This can produce a more stable wire coil that resists shifting during the transportation of wire container 10. Further, forming the wire coil into a generally solid mass, held together by the deposited material, the upward springing effect of the wire coil is greatly reduced wherein the deposited material can also help with the unwinding of the wire from the wire coil.

Material 104 can be an air cure material wherein the material solidifies or at least substantially solidifies between the time that it is dispensed from nozzle 114 and engages coil top 130. In yet another embodiment, the material remains at least substantially uncured until after it is position on coil top 130 such that adjacent particles can cure together after they are positioned within the coil. As can be appreciated, particles that cure together can produce different physical properties that can produce a more solid and stable wire coil.

In yet another embodiment, the nozzle can be secured relative to member 70 such that at least nozzle 114 remains positioned relative to top opening 16 during the winding of the wire coil.

With respect to the following embodiments, as is discussed above, the invention of this application is being discussed with respect to a particular winding machine for illustrative purposes only and can be used in connection with a wide variety of winding machines. Nonetheless, the embodiment discussed below and the corresponding figures will include like reference numbers for the components that are the same, or at least similar for illustrative purposes, to those discussed above.

Figure 3B:
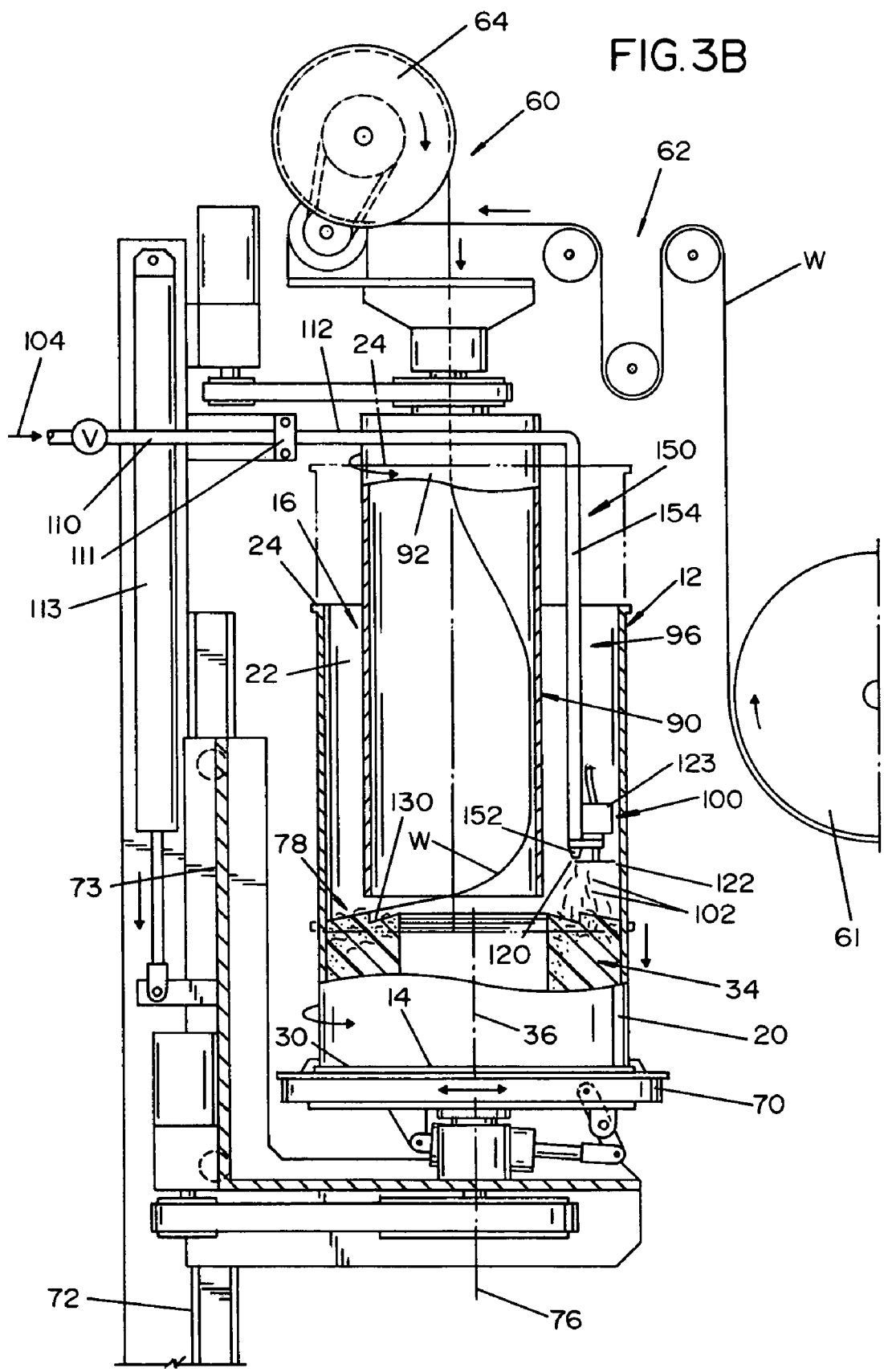
FIG. 3B is an elevational view of a winding machine for winding a welding wire container such as the container shown in FIG. 1 wherein the compressible material nozzle(s) extend(s) into the welding wire container during the winding of the welding wire coil and parts are broken away.

With reference to FIG. 3B, shown is a similar winding machine as is described above. However, in this embodiment, the machine includes a dispensing system 150 which includes a nozzle assembly 152 similar to nozzle 114. However, system 150 includes a different delivery tube arrangement wherein nozzle 152 is positioned close to coil top 130 during the winding of the wire. More particularly, 150 system includes an L-shape delivery tube 154 and/or an extension tube that extends into package 10. As with system 100, system 150 can include a similar chopping arrangement to produce particles of material 102 for depositing on and in the wire coil. In this embodiment, system 150 is connected relative to frame section 72, such that nozzle 152 maintains its position relative to coil top 130.

With reference to FIGS. 4A and 4B, shown are two dispensing configurations. In this respect, FIG. 4A corresponds with FIG. 3A and shows dispensing system 100 wherein dispensing system 100 can further include a pivoting joint 160 to allow nozzle 114, and corresponding components such as tube 112, chopper 122 and motor 123, to pivot about an axis 162 between positions 164 and 166, namely, a running position 164 and a loading position 166. As can be appreciated, pivot joint 160 allows the nozzle assembly to be moved out of the way to load and unload the winding machine. While one particular pivot joint is shown, the invention of this application can use a wide variety of pivot joints and/or other mechanism to allow the nozzle assembly to be moved between loading position 166 and running position 164. This can include, but is not limited to, flexible tubing to allow the necessary movement.

With reference to FIG. 4B, the invention of this application can also include multiple nozzles. In this respect, a dispensing system 180 is shown which includes two dispensing systems, as are described above, combined together. As can be appreciated, the two systems can be independent of one another or can be a multiple outlet single system. Shown are two systems that have separate inlets and separate outlets and can be mirror images of one another, even though that is not required. As with the other embodiment, system 180 can include one or more valves V to control the flow of material 104 to nozzle 114. As will be discuss below, the dispensing system can include a single nozzle or double nozzle arrangements or even several nozzles. The use of multiple nozzles can be used to apply additional material to the wire coil and/or for allowing a more uniform application of the material to the coil.

With reference to FIG. 5, shown is nozzle 114 with chopper 122. More particularly, chopper 122 is secured to nozzle 114 with a bracket 190, which maintains the chopper relative to the nozzle to in part control the particle size produced by the system. In one embodiment, the chopper is adjustable relative to the nozzle to allow additional control of the particle size. The particle size can also be controlled by the flow rate of material through the system. As is discussed above, the system can includes valves that can be used to control the flow of material 104 through the system. As the flow rate through the system increases, the amount of material deposited in the coil increases and the particle size increases if other factors remain constant. In addition, the opening size and shape of any of the nozzles can be changed to change the particle configuration which will also be discussed in greater detail below. As can be appreciated, the rate of rotation of the chopper will also have an impact on the particle size.

With reference to FIGS. 6A and 6B, the chopper can be any known blade-like arrangement. In this respect, shown is a chopper 192 which includes disc blade 194 that rotates about a chopper axis 195. Disc blade 194 includes an internal annular slot 196 extending about axis 195 between blade edges 200 and 202. The blade edges define the length of the blade slot. Slot 196 further includes a width 204 transverse to the slot length wherein width 204 is greater than the diameter of flow 120 from nozzle 114. Chopper 192 is positioned relative to nozzle 114 such that material flow 120 passes through slot 196 and is cut by blade edge 200 or 202. As can be appreciated, the length of the blade slot and/or the rotational speed of the chopper can be used to control the particle size produced by the chopper.

A chopper 210 is shown in FIG. 6B that includes three blades 212, 214 and 216. The blades rotate about axis 218 to cut flow 120 into particles. As can be appreciated, a number of blades can be used in chopper 210 without detracting from the invention of this application. As blades 212, 214 and 216 rotate about axis 218, they cut through the material flow 120 to produce particles 102. As with the embodiments discussed above, the chopper, along with the flow of fluid through the system, can be used to control the size and volume of particles.

With reference to FIGS. 7A and 7B, shown are particles 102 in coil 80. FIG. 7A is a section taken from near coil top 130 and FIG. 7B is a section taken below section 7A. As is shown, particles 102A are near the top of the wire coil and, in this embodiment, are still in a softened state or form while particles 102B are solidified or cured. More particularly, material 104 is in a liquid or substantially liquid form to allow the material to flow through the tubes such as tubes 110 and 112. Material 104 can be an air cure material such that the material begins curing as soon as it is dispensed from nozzle 114. Conversely, the material can be a chemical cure material wherein it is mixed in the system and is then dispensed or even is mixed as it is dispensed. In this embodiment, the material is dispensed as a liquid and is cut into particles 102 wherein particles 102A are only partially cured and are not fully solidified. As a result, the partially cured particles form better with wire W to fill in gaps and to form to a desired shape. In at least one embodiment, the particles can be a compressible material wherein the wire will distort the material as opposed to the material distorting the wire. Then, particles continue to cure until they solidify as particles 102B, thereby locking the wire in place around the solidified particles 102B. As can be appreciated, the solidified particles help maintain the shape of the coil wherein the coil is much more stable than a coil without particles according to the invention of this application.

With reference to FIGS. 8-11, shown are two additional chopping arrangements according to other aspects of the present invention that can be used to cut fluid stream 120 into particles 102. In this respect shown are cutter assemblies 230 and 232. Cutter assemblies 230 and 232 can utilize hot wire technology to cut the material for producing particles 102. In this respect, cutter assembly 230 includes a rocker wire cutter 236 having L-shaped legs 238 and 240 pivotably attached to a nozzle bracket 242, such that legs 238 and 240 can pivot about a leg axis 246. Leg 238 has a base end 250 including a mating half of the pivot joint with bracket 242 and extends between end 250 and a distal end 252. Leg 240 has a base end 256 including a mating half of the pivot joint with bracket 242 and extends between end 256 and a distal end 258. Cutter assembly further includes a cutting wire 260 extending between ends 252 and 258. The cutting wire is heated to cut through flow 120 as it is dispensed from nozzle 114. A motor, a cylinder 262 or any other mechanisms known in the art can be used to produce the pivoting or rocking action of assembly 240 about axis 246.

Cutter assembly 232 utilizes a rotating cutter wire, as opposed to the rocking wire discussed above. As can be appreciated, other wire cutting mechanisms known in the art could also be used to cut flow 120 according to the present invention. More particularly, assembly 232 includes wire cutting assembly 270 that rotates about a cutting axis 272. Cutting assembly 232 includes a support leg 280 and two wire legs 282 and 284 joined by a web 286. Legs 282 and 284 extend between a base end 290 and 292, respectively, to distal ends 294 and 296. Assembly 270 further includes a heated wire 298 extending between ends 294 and 296. The cutter assembly is rotated about axis 272 by a motor 299 wherein as the assembly rotates, wire 298 contacts flow 120 to cut the material into particles 102.

Figure 12:
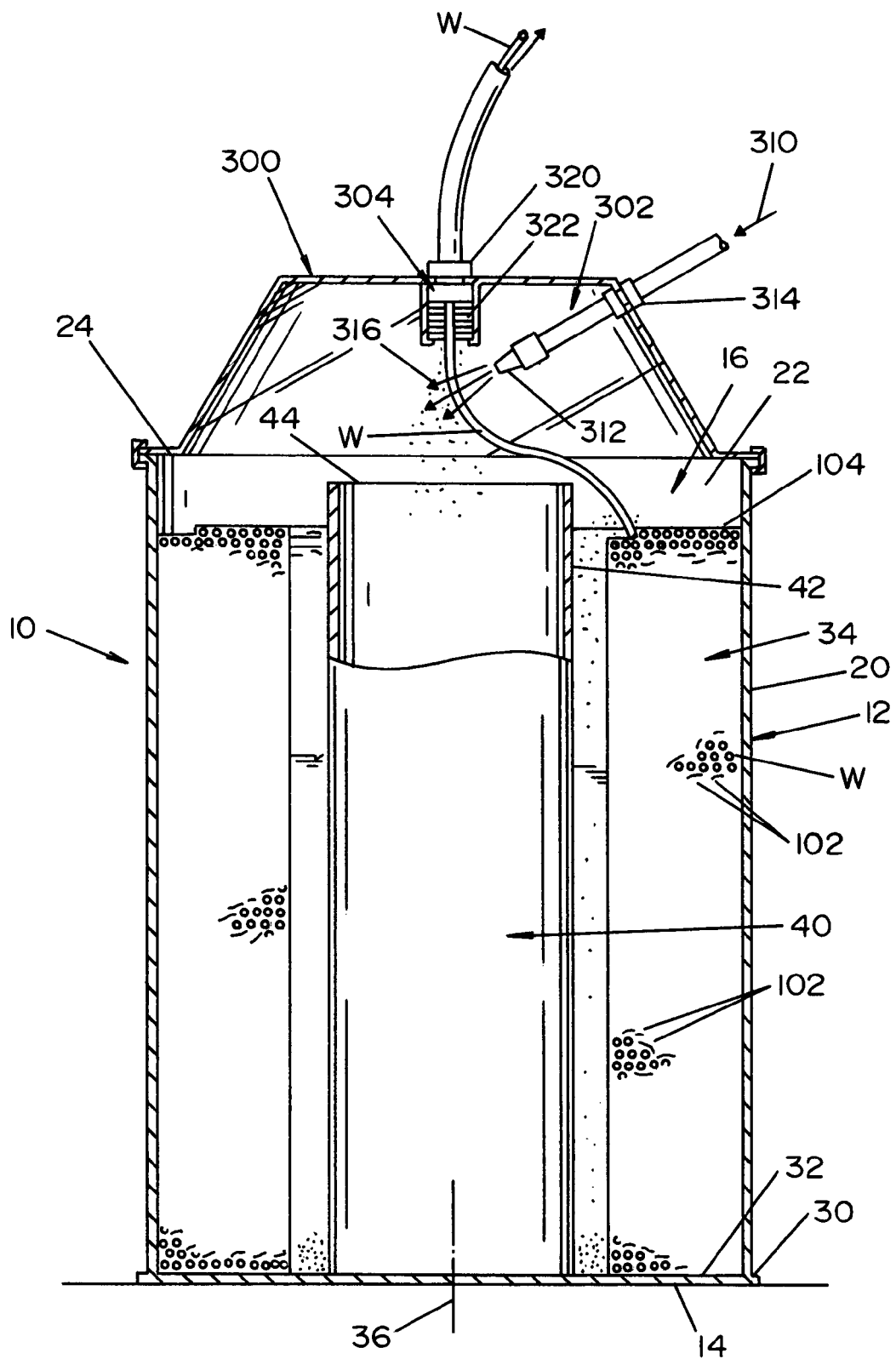
FIG. 12 is a front sectional view of a welding wire container according to another aspect of the present invention wherein the wire is being cleaned as it is unwound from the wire coil.

With reference to FIG. 12, package 10 including wire coil 34 is used to supply a welding wire to a welding operation. As is shown, one of the benefits of package 10 is that wire W can be unwound or payed out from coil 34 without a payout ring to control the unwinding of the wire. The particles positioned between the convolutions of the welding wire acts to prevent the natural upward spring of the welding wire. In addition, the particles can also act to create the needed resistance in the unwinding process to prevent one convolution of wire from interfering with another convolution of wire, thereby potentially causing a wire tangle. However, as can be appreciated, other wire controlling arrangements can also be used in connection with the unwinding of the wire from the coil. In this respect, package 10 could include a payout hat 300 to help control the unwinding of the welding wire. In addition, package 10 could include cleaning arrangements to ensure that all of material 104 is removed from the wire before it is directed to the welding operation. More particularly, package 10 could further include a blow tube 302 and/or a wiper assembly 304. As can be appreciated, it is best if the welding wire is free of any foreign matter before it reaches the wire feeding assembly to prevent clogging and/or jamming of the wire in the wire feeder. Further, it is best if any foreign matter is removed before the welding wire reaches the welding operation to prevent any adverse effects of the welding operation.

Blow tube 302 is attached to an air supply 310 that can be any supply of compressed air. Blow tube includes an air nozzle 312 and can be mounted to payout hat 300 by a tube mount 314. The nozzle is directed such that air flow 316 engages wire W as it is being directed toward an exit opening 320 in hat 300. The compressed air can be used to blow any remaining debris from the welding wire.

Wiper 304 can be mounted to hat 300 at or near hat opening 320, such that one or more wiper blades 322 lightly engage the wire as the wire is directed toward the exit opening. Again, the wiper assembly can work separately and/or in connection with the blow tube to clean the welding wire before it exits the container and enters a wire feed tube 324 of the wire feeding assembly (not shown).

With reference to FIGS. 13-21, the particles can be any one of many configurations without detracting from the invention of this application. Shown are examples of these configurations. It should be noted that these are examples only, and these examples are not intended to limit the invention of this application. Further, as will be discussed in greater detail below, the invention of this application is not to be limited to particles used in the wire coil. Constant streams of material can also be used in these figures and are also examples of the configurations of the constant streams used in accordance with the present invention.

Figure 13:
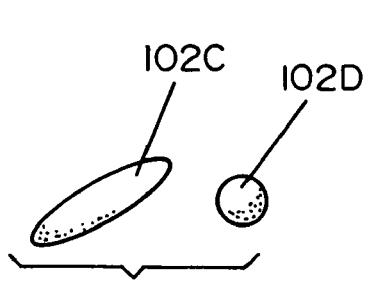
FIG. 13 is a perspective view of two foam particle configurations.
Figure 14:
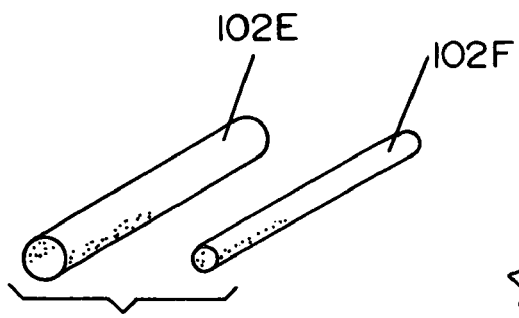
FIG. 14 is a perspective view of two additional foam particle configurations.
Figure 15:
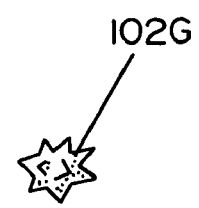
FIG. 15 is a perspective view of yet another foam particle configuration.
Figure 16:
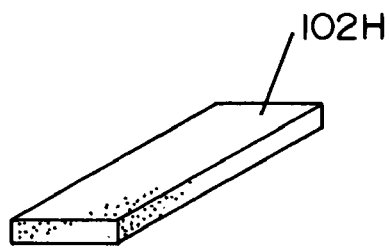
FIG. 16 is a perspective view of even yet another foam particle configuration.
Figure 17:
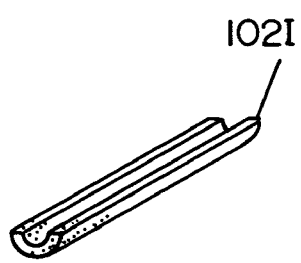
FIG. 17 is a perspective view of a further foam particle configuration.
Figure 18:
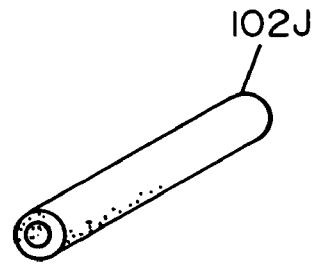
FIG. 18 is a perspective view of yet a further foam particle configuration.
Figure 19:
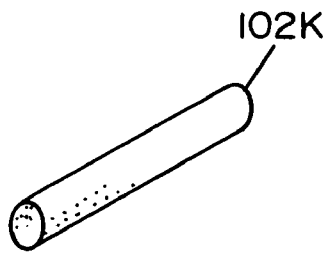
FIG. 19 is a perspective view of another foam particle configuration.
Figure 20:
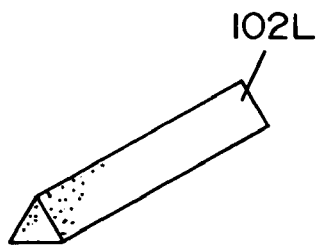
FIG. 20 is a perspective view of yet another foam particle configuration.
Figure 21:
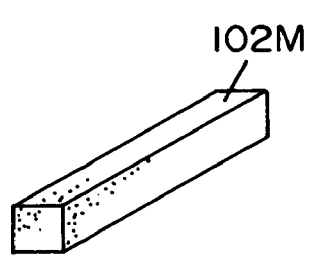
FIG. 21 is a perspective view of even yet another foam particle configuration.

FIG. 13 shows an elongated oval configuration 102C and a spherical particle 102D. FIG. 14 shows two cylindrical particle configurations 102E and 102 F. FIG. 15 shows a generally spherical particle 102G with an uneven outer surface. FIG. 16 shows a rectangular configuration 102H. FIG. 17 shows a U-shaped configuration 102I. FIG. 18 shows a tubular configuration 102J. FIG. 19 shows an oval configuration 102K. FIG. 20 shows a triangular configuration 102L. FIG. 21 shows a square configuration 102M.

With reference to FIGS. 22A-24, the invention of this application can further include use of a solid material 350 that is cut or slit to the desire configuration. In this respect, FIG. 22A shows a feeding assembly 351 for solid material 350 which can be slit by a slitter 352 into a plurality of slit portions 354. Slit portions are then cut into a desired length by a chopper 360. Chopper 360 can include a funnel opening 362 to direct slit portions 354 into the chopper. As with the other choppers, chopper 360 can be driven by motor M wherein strips are cut to a desired length and directed to a feeding tube 364. Feeding tube 364 then directs the cut pieces to a blower assembly 370 that forces the cut pieces into feeding tube 372 wherein the particles are directed to an outlet 374 and are deposited into container 10 as the wire is being deposited in the container. As with the embodiments discussed above, the particles become interspersed in the wire coil, thereby functioning as described above. Feeding assembly 351 can be mounted to the winding machine by a brace 376 to secure the assembly relative to the machine. As with the other embodiments of this application, while the outlets are shown at a fixed point or fixed points, the movement of the rotational and side-to-side movement of the wire container causes the material to be evenly deposited in the wire container.

Shown in FIG. 22B is a feeding assembly 380, which is similar to assembly 351 except it includes multiple outlets. In this respect, assembly 380 feeds the material into a Y-shaped feeding tube 382 as the material exits blower 370. Tube 382 includes tube legs 384 and 386, which have outlets 390 and 392, respectively. As a result, the material is deposited at two points in the container simultaneously. While not shown, more than two outlets could be used without detracting from the invention of this application. Feeding assembly 382 can be mounted to the winding machine by a brace 394 to secure the assembly relative to the machine.

Shown in FIG. 22C is a feeding assembly 400 which feeds a sheet material 402 from a supply roll 404. Sheet material 402 can be driven toward a chopper 406 by drive rollers 410 and 412. Chopper 406 can include a funnel opening 414 to direct the sheet material into the chopper. As with the other choppers, chopper 406 can be driven by motor M wherein the sheet material is cut to a desired length and directed to a feeding tube 420. Feeding tube 364 then directs the cut pieces to a blower assembly 422 that forces the cut pieces into a feeding tube 424 wherein the particles are directed to an outlet (not shown). Feeding assembly 400 can be mounted to the winding machine by a brace 426.

Shown in FIG. 22D is a feeding assembly 430 which feeds already formed particles 432 into container 10. More particularly, a conveyor 434, or other methods known in the art, delivers particles 432 to a blower 436 having an inlet funnel arrangement 440. Blower 440 then moves the particles into a delivery tube 442 toward an outlet (not shown). While several embodiments of this invention are described to include a blower, other particle delivery systems known in the art could be used to move the particles from the chopper to the outlets. Feeding assembly 430 can be mounted to the winding machine by a brace 444.

Shown in FIGS. 23 and 24 are details of a chopper 360 that can be used in the practice of the invention of this application. In this respect, chopper 360 includes an outer housing 450 that can be separate or integral with funnel opening 362. Housing 450 supports a blade assembly 452 secured to blade shaft 454 by key 456. Blade assembly 452 is driven by a motor M to rotate about a blade axis 460 and includes blades 462-465. As strips, or even larger particles, enter chopper 360, they engage one or more of blades 462-465 which cut the material to a desired length or range of lengths. Again, while all particles are being referenced as reference number 102 for illustrative purposes, the particles in all embodiments are not to be construed as being the same. As is discussed above, the particles can be a range of configurations, sizes and lengths without detracting from the invention of this application.

Figure 25:
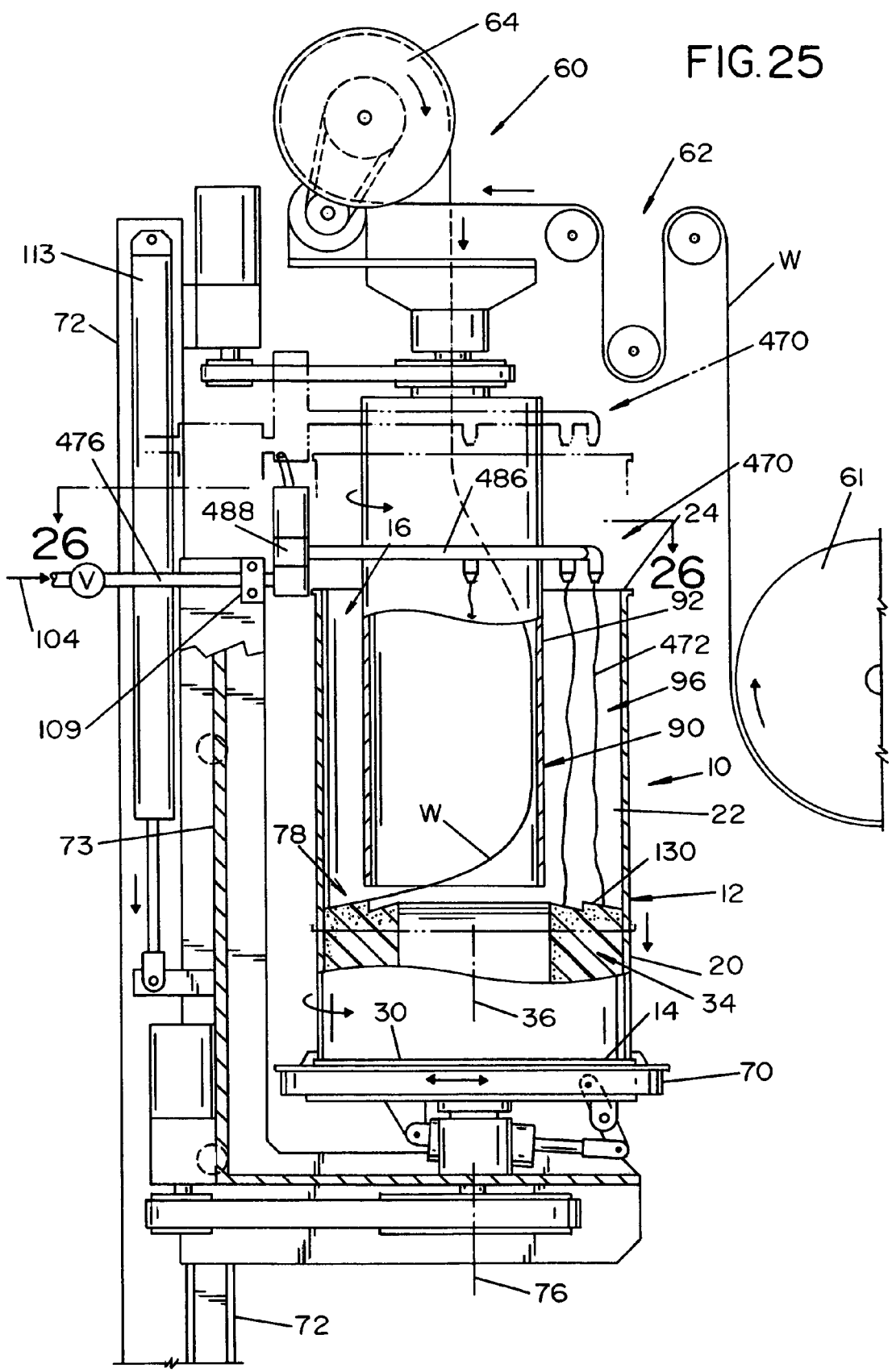
FIG. 25 is an elevational view of yet another winding machine for winding a welding wire container such as the container shown in FIG. 1 wherein the compressible material nozzle(s) remain(s) above the welding wire container during the winding of the welding wire coil and dispenses a continuous stream of material; and parts are broken away.
Figure 26:
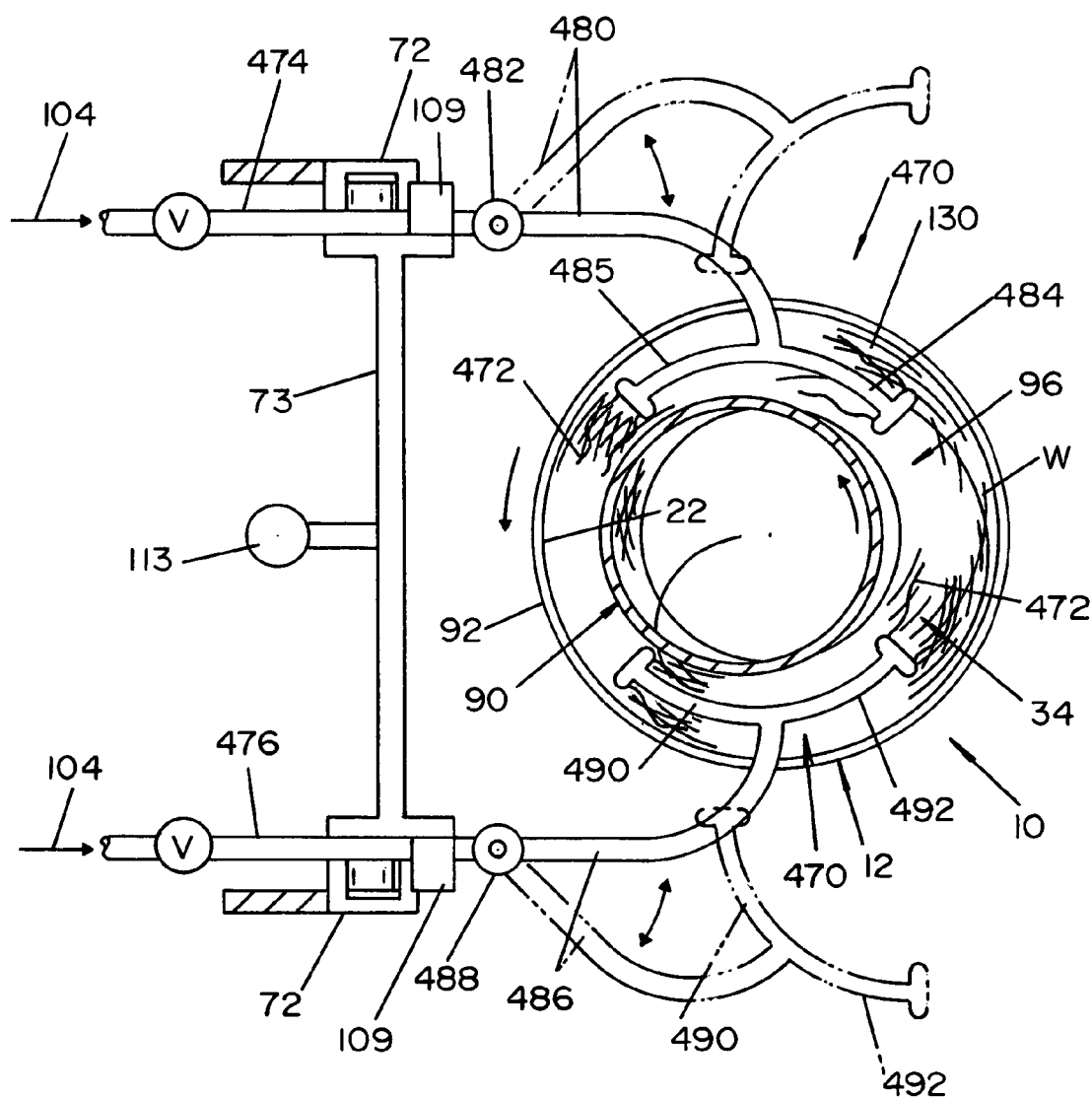
FIG. 26 is a sectional view taken generally along line 26-26 of FIG. 25.
Figure 27:
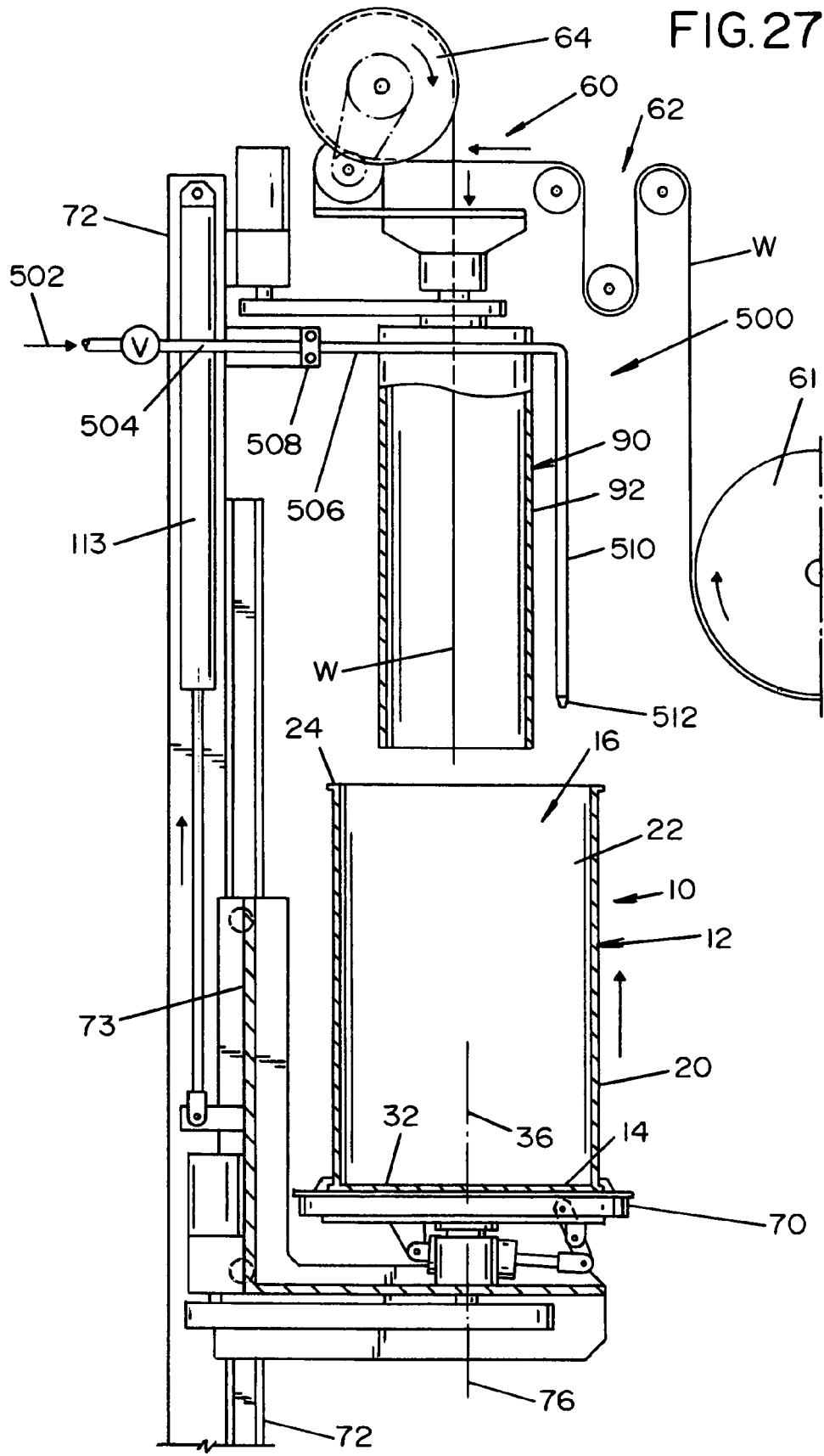
FIG. 27 is an elevational view of a winding machine for winding a welding wire container such as the container shown in FIG. 1 wherein the compressible material nozzle(s) extend(s) into the welding wire container during the winding of the welding wire coil and delivers a continuous spray of material and wherein parts are broken away, and the machine is ready to begin loading wire into the container.
Figure 28:
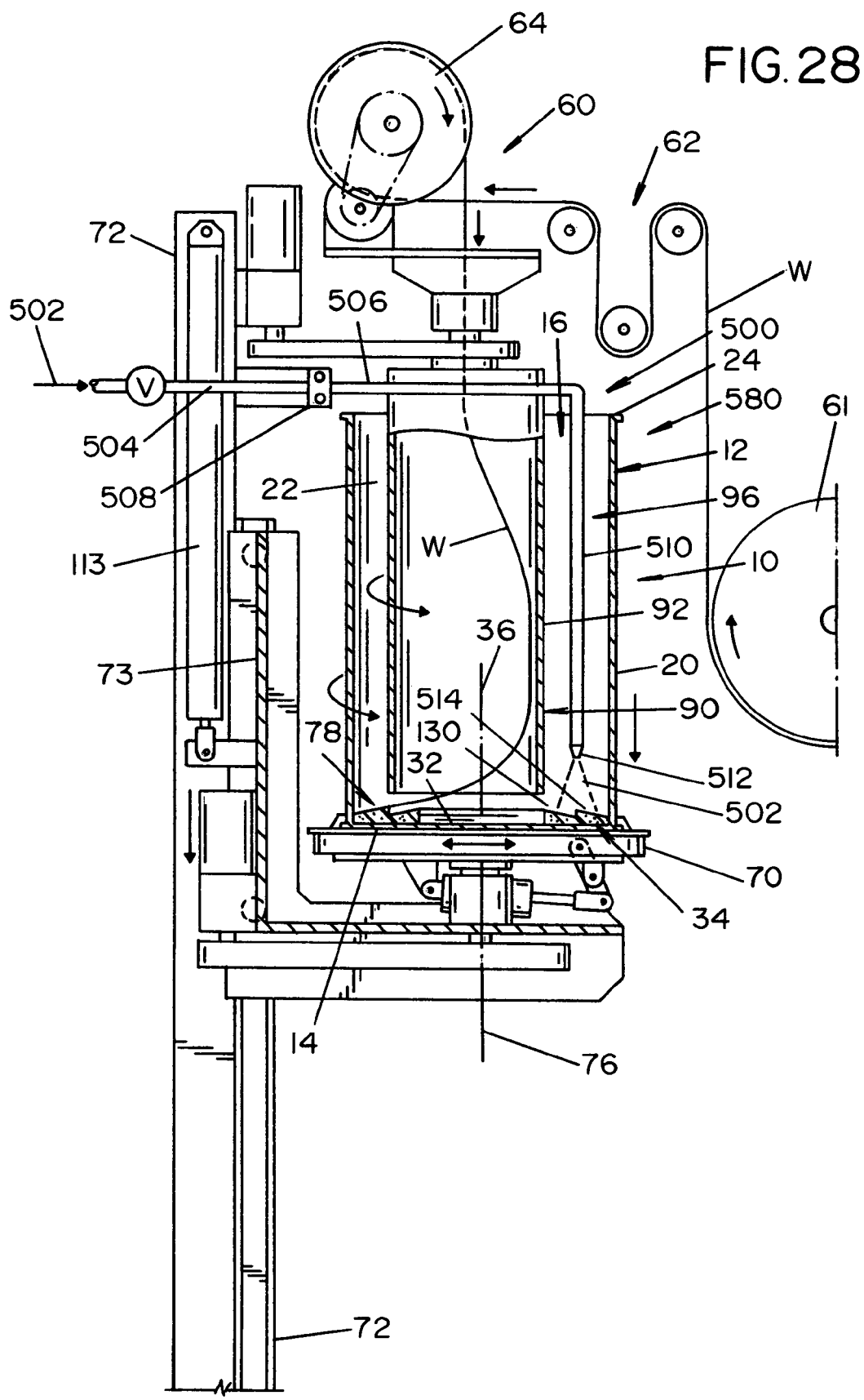
FIG. 28 is an elevational view of a winding machine for winding a welding wire container, such as the container shown in FIG. 1, wherein the compressible material nozzle(s) extend(s) into the welding wire container during the winding of the welding wire coil and delivers a continuous spray of material and wherein parts are broken away, and the machine is loading wire into the container with the material being applied.
Figure 29:
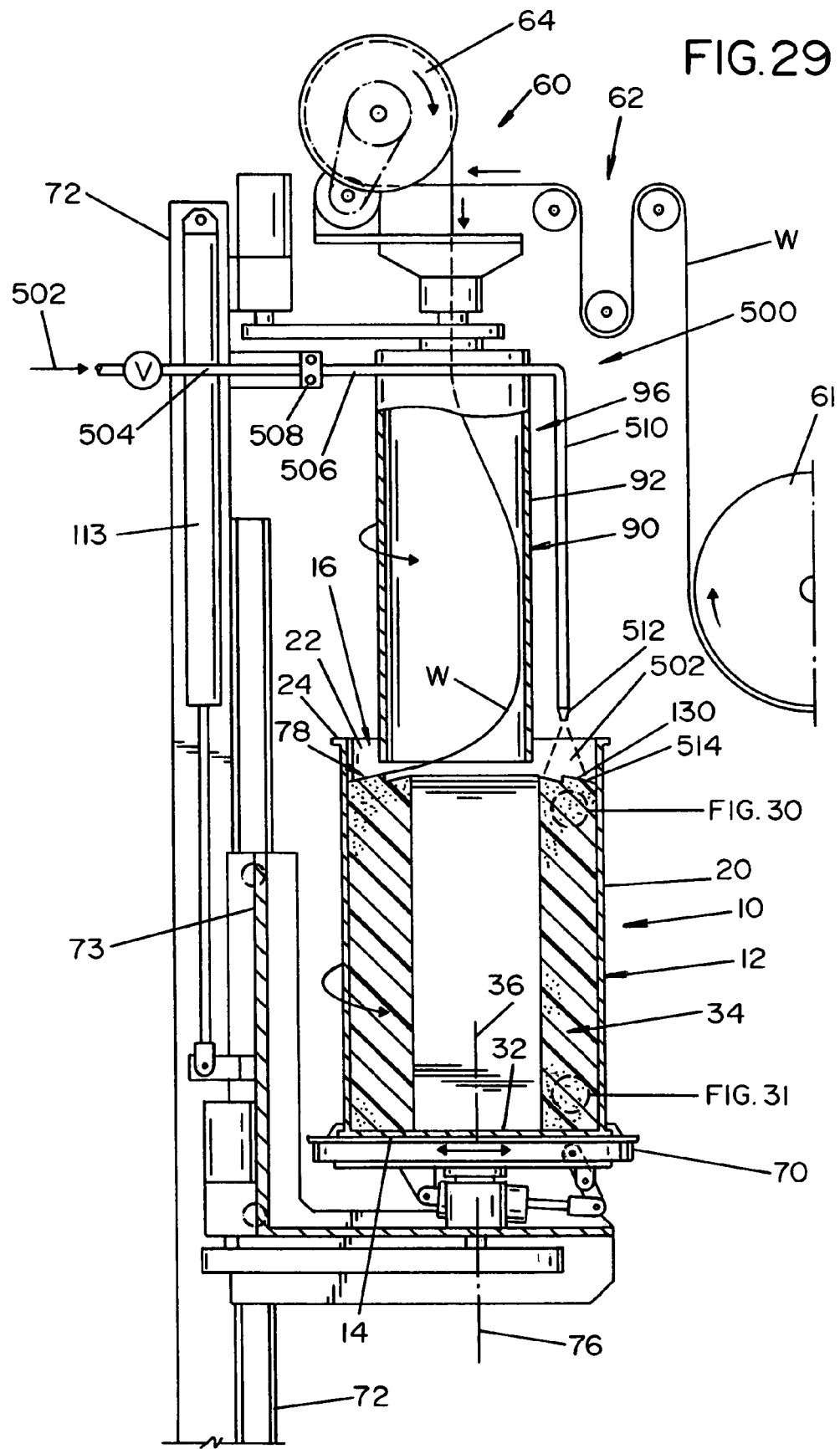
FIG. 29 is an elevational view of a winding machine for winding a welding wire container such as the container shown in FIG. 1 wherein the compressible material nozzle(s) extend(s) into the welding wire container during the winding of the welding wire coil and delivers a continuous spray of material and wherein parts are broken away, and the machine is loading wire into the container with the material being applied.
Figure 30:
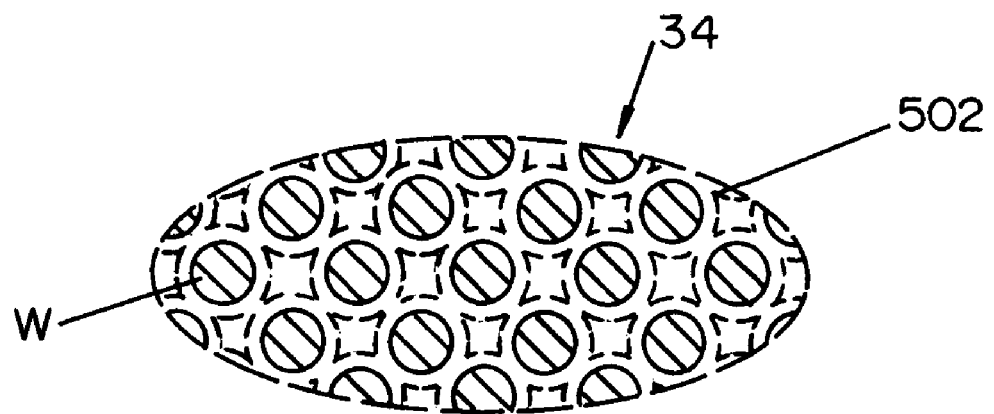
FIG. 30 is an enlarged view of a portion of the welding wire and compressible material taken from section 30 in FIG. 29 near the top of the container; and, FIG. 31 is an enlarged view of a portion of the welding wire and compressible material taken from section 31 in FIG. 29 below section 30.

With reference to FIG. 25, shown is a feeding assembly 470 wherein material 104 can be deposited into container 10 as one or more continuous streams 472. Material 104 enters feeding tubes 474 and 476 that can include valves V to control the flow of the fluid through the system. The fluid in tube 474 is then directed toward tube 480 that can be pivotably joined to tube 474 by a pivot joint 482. Tube 480 can be a Y-shaped tube such that it can have multiple outlet arms 484 and 485 to provide a more uniform deposit of material 104. The fluid in tube 476 is then directed toward tube 486 that can be pivotably joined to tube 476 by a pivot joint 488. Tube 480 also can be a Y-shaped tube, such that it can have multiple outlet arms 490 and 492 to provide a more uniform deposit of material 104. Further, any one of the outlet arms can include multiple outlets. As is shown, each outlet arm is T-shaped to allow multiple outlets to be positioned on the end of each arm. In addition, the pivotable movement of arms 480 and 486 allows the arms to be moved for clearance to allow the container to be loaded and unloaded.

Figure 31:
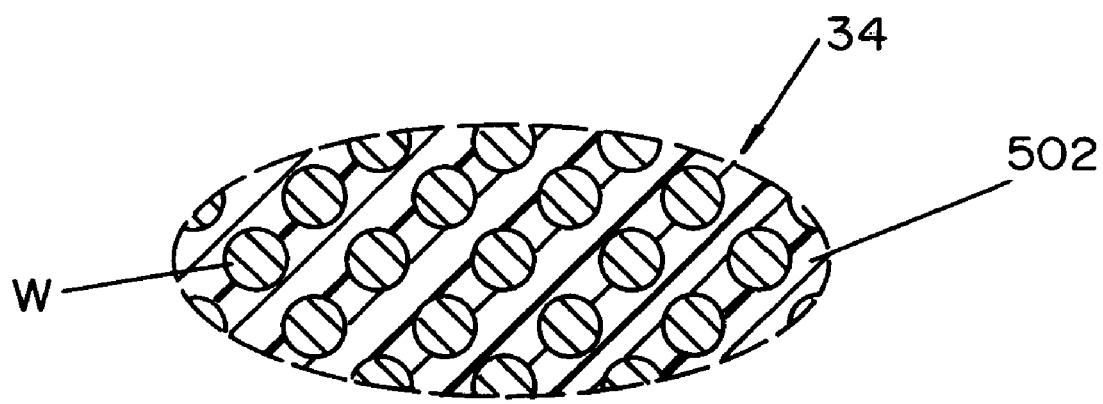

With reference to FIGS. 27-31, shown is a feeder assembly 500 that sprays a liquid 502 into container 10. In this respect, feeder assembly 500 delivers a material 502 that is a spray. Material 502 can be the same as material 104 or can be a different material. In this respect, and for example only, material 502 could be a fluid of lower viscosity than material 104 to allow for a better spray application on the wire. As with the other embodiments, assembly 500 can include a valve V to control the flow of the material to be deposited. Material 502 is directed through a feeding tube 504 that can be pivotably connected to a feeding tube 506 by a pivot joint 508. Tube 506 can be an L-shaped tube having a downward leg 510 with outlet nozzle 512. As with the embodiments discussed above, nozzle 512 can be at or near the top of the coil or can be spaced from the top of the coil. As is shown, nozzle 512 is near a coil top 514 as the wire is being wound into the coil. As a result, nozzle 512 must move relative to frame 72 such that it follows coil top 514 as wire is wound into the coil. By spraying material 502 into the wire coil as it is wound, the liquid can completely cover a portion of the welding wire (FIG. 30) wherein the wire coil will become a generally solid wire coil when material 502 solidifies as a solid 520 (FIG. 31). This produces a very stable wire coil that will resist shifting during transport of container 10 to the job site.

As a result, as with the other embodiments, hold-down mechanisms are not needed to maintain the wire coil during shipping. Further, the use of retainer or payout rings can be eliminated or at least lessened such that the weight of the ring can be drastically reduced and can be made from lighter weight material that is less costly and recyclable.

In addition, while not discussed in detail, any of the embodiments above can include other mechanisms known in the art, such as other wire controlling mechanisms which can be used to control the out flowing welding wire from the container beyond those discussed above.

While considerable emphasis has been placed on the preferred embodiments of the invention illustrated and described herein, it will be appreciated that other embodiments and/or equivalents thereof can be made and that many changes can be made in the preferred embodiments without departing from the principles of the invention. Accordingly, it is to be distinctly understood that the foregoing descriptive matter is to be interpreted merely as illustrative of the invention and not as a limitation.

Having thus defined the invention, the following is claimed:

1. A coil of welding wire and a container for packaging and unwinding said coil of welding wire formed by a plurality of convolutions of said welding wire, said container comprising: an outer container including at least one vertically extending side wall; a wire receiving cavity within said outer container for receiving said wire coil formed by a single strand of said welding wire, said outer container further including a closed bottom and a top opening for removing said welding wire from said wire coil, said container further including a foam intermixed within said wire coil in said wire receiving cavity.

2. The container as defined in claim 1, wherein said foam includes an air curing foam.

3. The container as defined in claim 2, wherein said foam includes a non-magnetic foam.

4. The container as defined in claim 3, wherein said foam includes non-adhesive foam.

5. The container as defined in claim 4, wherein said foam includes a cellulose foam.

6. The container as defined in claim 1, wherein said foam includes a cellulose foam.

7. The container as defined in claim 2, wherein said foam includes a cellulose foam.

8. The container as defined in claim 3, wherein said foam includes a cellulose foam.

9. The container as defined in claim 1, wherein said foam is a plurality of foam particles interspersed within said wire coil.

10. The container as defined in claim 9, wherein said plurality of foam particles are a plurality of elongated foam particles.

11. The container as defined in claim 1, wherein said wire coil is formed by a plurality of convolutions of said single strand of said welding wire that extend from a bottom convolution adjacent said closed bottom of said container to a top convolution opposite to said bottom convolution and said top convolution being near said top opening said foam being intermixed in said wire coil from near said bottom convolution to near said top convolution.

12. The container as defined in claim 11, wherein said foam is intermixed substantially uniformly between said bottom and top convolutions.

13. The container as defined in claim 1, wherein said wire coil has a bottom coil surface near said closed bottom of said container that is supported by said closed bottom and a top coil surface opposite to said bottom surface and which is near said top opening, said foam being a plurality of foam particles between said top and bottom surfaces.

14. A coil of welding wire and a container for packaging and unwinding said coil of welding wire formed by a plurality of convolutions of said welding wire, said container comprising: an outer container including at least one vertically extending side wall; a wire receiving cavity within said outer container for receiving said wire coil formed by a single strand of said welding wire, said outer container further including a closed bottom and a top opening for removing said welding wire from said wire coil, said container further including a compressible material intermixed within said wire coil in said wire receiving cavity.

15. The container as defined in claim 14, wherein said wire coil is formed by a plurality of convolutions of said single strand of said welding wire, said compressible material engages each of said plurality of convolution of said welding wire.

16. The container as defined in claim 14, wherein said compressible material includes a plurality of compressible particles interspersed within said wire coil.

17. The container as defined in claim 16, wherein said compressible particles are elongated particles.

18. The container as defined in claim 14, wherein said wire coil is formed by a plurality of convolutions of said welding wire that extend from a bottom convolution near said closed bottom of said container to a top convolution space from and opposite to said bottom convolution and said top convolution being near said top opening, said compressible material being intermixed in said wire coil from said bottom convolution to said top convolution.

19. The container as defined in claim 14, wherein said compressible material is intermixed substantially uniformly between said bottom convolution and said top convolution of said wire coil.

* * * * *